(12) United States Patent
Wang et al.

(10) Patent No.: US 11,977,273 B2
(45) Date of Patent: May 7, 2024

(54) OPTICAL LENS SYSTEM AND PHOTOGRAPHING MODULE

(71) Applicant: NEWMAX TECHNOLOGY CO., LTD., Taichung (TW)

(72) Inventors: Chi-Chang Wang, Taichung (TW); Kun-Rui Wu, Taichung (TW)

(*) Notice: Subject to any disclaimer, the term of this patent is extended or adjusted under 35 U.S.C. 154(b) by 253 days.

(21) Appl. No.: 17/373,764

(22) Filed: Jul. 12, 2021

(65) Prior Publication Data

US 2022/0269042 A1   Aug. 25, 2022

(30) Foreign Application Priority Data

Feb. 24, 2021  (TW) .................... 110106397

(51) Int. Cl.
   *G02B 9/12*     (2006.01)
   *G02B 13/00*    (2006.01)
   *G03B 17/12*    (2021.01)

(52) U.S. Cl.
   CPC ........... *G02B 9/12* (2013.01); *G02B 13/0035* (2013.01); *G03B 17/12* (2013.01)

(58) Field of Classification Search
   CPC ...... G02B 9/12; G02B 13/0035; G03B 17/12; G03B 30/00
   See application file for complete search history.

(56) References Cited

U.S. PATENT DOCUMENTS

| 7,639,434 B2 * | 12/2009 | Nio ............ G02B 9/12 359/791 |
| 2014/0253677 A1 * | 9/2014 | Chen ............ G02B 13/002 348/36 |
| 2021/0349285 A1 * | 11/2021 | Chang ............ H04N 23/58 |

\* cited by examiner

*Primary Examiner* — Alicia M Harrington
(74) *Attorney, Agent, or Firm* — Bruce Stone LLP; Joseph A. Bruce

(57) ABSTRACT

An optical lens system includes, in order from the object side to the image side: a stop, a first lens with positive refractive power, a second lens with positive refractive power, a third lens with negative refractive power, wherein a distance from an image-side surface of the third lens to an image plane along an optical axis is BFL, a distance from an object-side surface of the first lens to the image plane along the optical axis is TL, following condition is satisfied: $0.38<BFL/TL<0.58$. Such arrangements can meet the requirement of miniaturization under the condition of longer back focal length.

20 Claims, 19 Drawing Sheets

OPTICAL LENS SYSTEM AND PHOTOGRAPHING MODULE

BACKGROUND

Field of the Invention

The present invention relates to an optical lens system and photographing module, and more particularly to an optical lens system and photographing module applicable to electronic products.

Description of Related Art

In recent years, with the rapid development of portable electronic products, such as, smartphone, tablet computer, notebook and so on, photographing module applied to portable electronic products has been indispensable. In addition, as the advanced semiconductor manufacturing technologies have allowed the image sensors with smaller size and higher image resolution, there's an increasing demand for an optical lens system with better image quality.

As the photographing module becomes smaller with higher image resolution, adjusting the back focal length of lens properly can satisfy different application designs, such as, image sensor with CSP technology, or optical imaging system with longer back focal length. How to develop an optical system that satisfies the objective of miniaturization under the condition of longer back focal length and improving the illumination of the system is the motivation of the present invention.

The present invention mitigates and/or obviates the aforementioned disadvantages.

SUMMARY

The primary objective of the present invention is to provide an optical lens system and photographing module. When a specific condition is satisfied, the optical lens system of the present invention can satisfy longer back focal length, improve the illumination of the system, satisfy the objective of miniaturization and improve the image quality.

Therefore, an optical lens system in accordance with the present invention comprises, in order from an object side to an image side: a stop; a first lens with positive refractive power, comprising an object-side surface and an image-side surface, the object-side surface of the first lens being convex near an optical axis, and the object-side surface and the image-side surface of the first lens being aspheric; a second lens with positive refractive power, comprising an object-side surface and an image-side surface, the object-side surface of the second lens being concave near the optical axis and the image-side surface of the second lens being convex near the optical axis, and the object-side surface and the image-side surface of the second lens being aspheric; and a third lens with negative refractive power, comprising an object-side surface and an image-side surface, the image-side surface of the third lens being concave near the optical axis, and the object-side surface and the image-side surface of the third lens being aspheric.

Wherein a distance from the image-side surface of the third lenses to an image plane along the optical axis is BFL, a distance from the object-side surface of the first lens to the image plane along the optical axis is TL, and following condition is satisfied: $0.38 < BFL/TL < 0.58$.

Preferably, the optical lens system has a total of three lenses with refractive power.

The present invention has the following effect: if the above three lenses with refractive power satisfy the condition $0.38 < BFL/TL < 0.58$, it can meet the requirement of miniaturization under the condition of longer back focal length. Preferably, following condition can be satisfied: $0.43 < BFL/TL < 0.54$.

Preferably, the optical lens system has a maximum view angle (field of view) FOV, a focal length of the optical lens system is f, and following condition is satisfied: $29.58 < FOV/f < 78.49$, which can effectively collect large angle light and expand the range of image reception. Preferably, following condition can be satisfied: $33.06 < FOV/f < 71.95$.

Preferably, a distance from the stop to the image-side surface of the third lens along the optical axis is SD, the distance from the object-side surface of the first lens to the image plane along the optical axis is TL, and following condition is satisfied: $0.35 < SD/TL < 0.57$, which is favorable to achieve a proper balance between miniaturization and the back focal length. Preferably, following condition can be satisfied: $0.4 < SD/TL < 0.55$.

Preferably, the focal length of the optical lens system is f, the distance from the object-side surface of the first lens to the image plane along the optical axis is TL, and following condition is satisfied: $0.65 < f/TL < 0.86$, which can adjust the total length and focal length of the optical lens system, so as to achieve a balance between reducing the total length and adjusting the angle of view. Preferably, following condition can be satisfied: $0.67 < f/TL < 0.82$.

Preferably, a radius of curvature of the object-side surface of the second lens is R3, an incident pupil aperture of the optical lens system is EPD, and following condition is satisfied: $-1.5 < R3/EPD < -0.3$, so that the incident aperture of the lens can be effectively adjusted to ensure the amount of incident light of the system and improve the image brightness. Preferably, following condition can be satisfied: $-1.38 < R3/EPD < -0.4$.

Preferably, a focal length of the second lens is f2, the incident pupil aperture of the optical lens system is EPD, and following condition is satisfied: $1.5 < f2/EPD < 198.77$, so as to effectively improve the illumination and optical properties of the system. Preferably, following condition can be satisfied: $1.6 < f2/EPD < 189.73$.

Preferably, a distance from the object-side surface of the first lens to the image-side surface of the third lens along the optical axis is TD, the distance from the object-side surface of the first lens to the image plane along the optical axis is TL, and following condition is satisfied: $0.36 < TD/TL < 0.62$, which is favorable to achieve a proper balance between miniaturization and the back focal length. Preferably, following condition can be satisfied: $0.4 < TD/TL < 0.60$.

Preferably, the distance from the object-side surface of the first lens to the image-side surface of the third lens along the optical axis is TD, the distance from the image-side surface of the third lens to the image plane along the optical axis is BFL, and following condition is satisfied: $0.68 < TD/BFL < 1.63$. Preferably, following condition can be satisfied: $0.77 < TD/BFL < 1.49$.

Another optical lens system in accordance with the present invention comprises, in order from an object side to an image side: a stop; a first lens with positive refractive power, comprising an object-side surface and an image-side surface, the object-side surface of the first lens being convex near an optical axis, and the object-side surface and the image-side surface of the first lens being aspheric; a second lens with positive refractive power, comprising an object-side surface and an image-side surface, the object-side surface of the second lens being concave near the optical axis and the image-side surface of the second lens being convex near the optical axis, and the object-side surface and the image-side surface of the second lens being aspheric; and a third lens with negative refractive power, comprising an object-side surface and an image-side surface, the image-side surface of the third lens being concave near the optical axis, and the object-side surface and the image-side surface of the third lens being aspheric.

Wherein an incident pupil aperture of the optical lens system is EPD, a distance from the stop to the image-side surface of the third lens along the optical axis is SD, and following conditions are satisfied: 0.3<EPD<1.2 and 0.35<SD/TL<0.57.

Preferably, the optical lens system has a total of three lenses with refractive power.

The present invention has the following effect: if the above three lenses with refractive power satisfy the condition 0.35<SD/TL<0.57, it is favorable to achieve a proper balance between miniaturization and the back focal length. In addition, if following condition is satisfied 0.3<EPD<1.2, it can improve the illumination and optical properties of the system. Preferably, following conditions can be satisfied: 0.47<EPD<1.04, 0.4<SD/TL<0.55.

Preferably, a distance from the image-side surface of the first lens to the object-side surface of the second lens along the optical axis is T12, a central thickness of the second lens along the optical axis is CT2, and following condition is satisfied: 0.6<T12/CT2<1.33, which can adjust the lens thickness and lens spacing, so as to reduce the effect of manufacturing tolerance on image quality. Preferably, following condition can be satisfied: 0.67<T12/CT2<1.22.

Preferably, a distance from the image-side surface of the third lens to an image plane along the optical axis is BFL, the distance from the object-side surface of the first lens to the image plane along the optical axis is TL, and following condition is satisfied: 0.38<BFL/TL<0.58, which can meet the requirement of miniaturization under the condition of longer back focal length.

Preferably, the optical lens system has a maximum view angle (field of view) FOV, a focal length of the optical lens system is f, and following condition is satisfied: 29.58<FOV/f<78.49, which can effectively collect large angle light and expand the range of image reception. Preferably, following condition can be satisfied: 33.06<FOV/f<71.95.

Preferably, a focal length of the first lens is f1, a focal length of the second lens is f2, and following condition is satisfied: 0.008<f1/f2<1.58, which can effectively shorten the total length and reduce the aberration. Preferably, following condition can be satisfied: 0.008<f1/f2<1.51.

Preferably, a radius of curvature of the object-side surface of the second lens is R3, the incident pupil aperture of the optical lens system is EPD, and following condition is satisfied: −1.5<R3/EPD<−0.3, so that the incident aperture of the optical lens system can be effectively adjusted to ensure the amount of incident light of the system and improve the image brightness. Preferably, following condition can be satisfied: −1.38<R3/EPD<−0.4.

Preferably, the focal length of the second lens is f2, the incident pupil aperture of the optical lens system is EPD, and following condition is satisfied: 1.5<f2/EPD<198.77, so as to effectively improve the illumination and optical properties of the system. Preferably, following condition can be satisfied: 1.6<f2/EPD<189.73.

Preferably, the distance from the image-side surface of the third lens to the image plane along the optical axis is BFL, the distance from the object-side surface of the first lens to the image plane along the optical axis is TL, and following condition is satisfied: 0.43<BFL/TL<0.54, which can meet the requirement of miniaturization under the condition of longer back focal length.

Preferably, a distance from the object-side surface of the first lens to the image-side surface of the third lens along the optical axis is TD, the distance from the image-side surface of the third lens to the image plane along the optical axis is BFL, and following condition is satisfied: 0.68<TD/BFL<1.63. Preferably, following condition can be satisfied: 0.77<TD/BFL<1.49.

A photographing module in accordance with the present invention comprises the above optical lens system, a lens barrel for accommodating the optical lens system, and an image sensor disposed on the image plane of the optical lens system.

For each of the above optical lens systems or the photographing module, wherein the focal length of the optical lens system is f, and following condition is satisfied: 1.08 mm<f<2.47 mm. Preferably, following condition can be satisfied: 1.14 mm<f<2.35 mm.

For each of the above optical lens systems or the photographing module, a f-number of the optical lens system is Fno, and following condition is satisfied: 1.87<Fno<2.78. Preferably, following condition can be satisfied: 1.97<Fno<2.66.

For each of the above optical lens systems or the photographing module, the optical lens system has a maximum view angle (field of view) FOV, and following condition is satisfied: 67 degrees<FOV<87 degrees. Preferably, following condition can be satisfied: 71 degrees<FOV<83 degrees.

The present invention will be presented in further details from the following descriptions with the accompanying drawings, which show, for purpose of illustrations only, the preferred embodiments in accordance with the present invention.

DETAILED DESCRIPTION

Figure 1A:
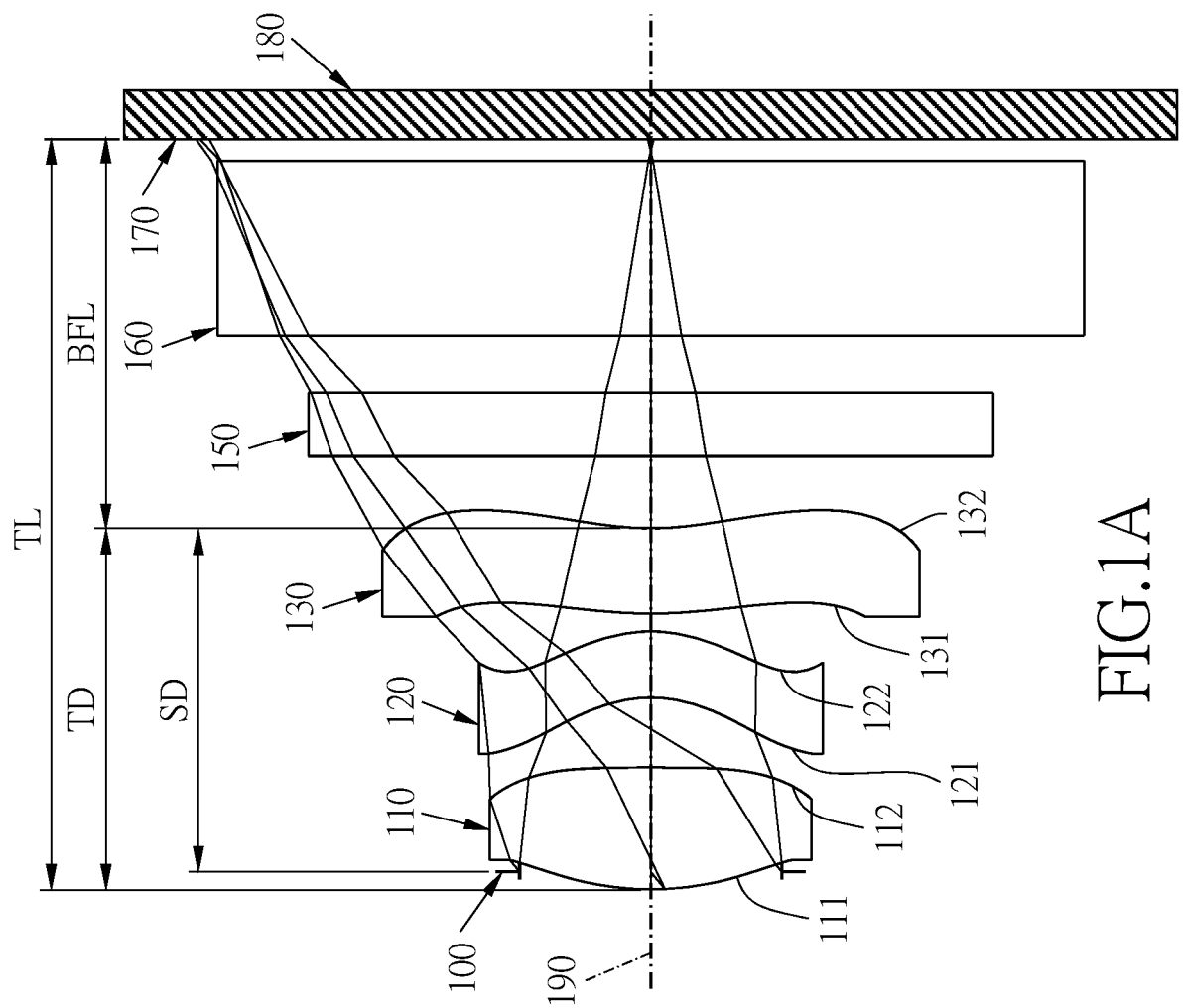
FIG. 1A shows an optical lens system in accordance with a first embodiment of the present invention.
Figure 1B:
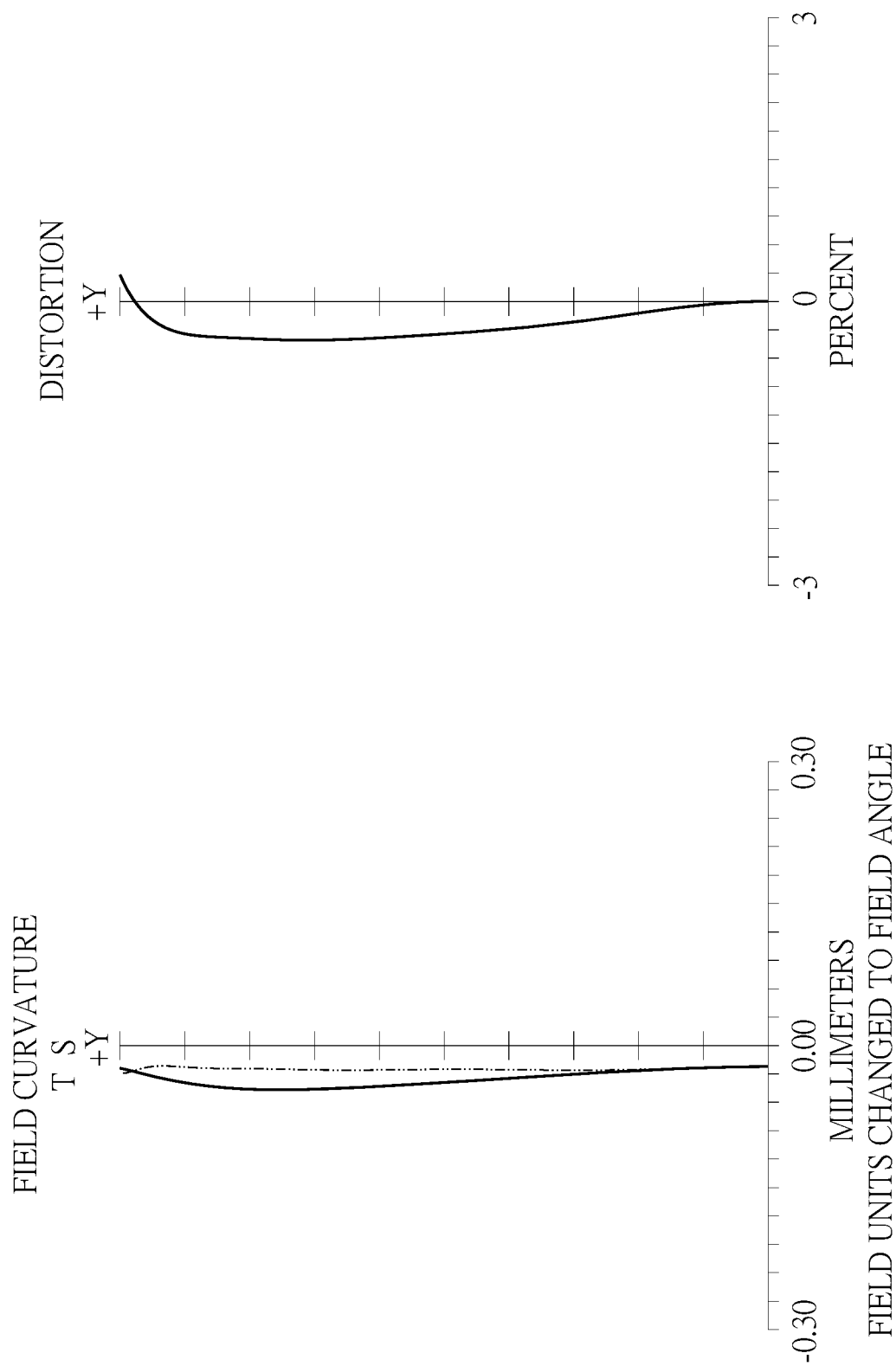
FIG. 1B shows the image plane curve and the distortion curve of the first embodiment of the present invention.

Referring to FIGS. 1A and 1B, FIG. 1A shows an optical lens system in accordance with a first embodiment of the present invention, and FIG. 1B shows, in order from left to right, the image plane curve and the distortion curve of the first embodiment of the present invention. An optical lens system in accordance with the first embodiment of the present invention comprises a stop 100 and a lens group. The optical lens system is provided with an image sensor 180. The lens group comprises, in order from an object side to an image side along an optical axis 190: a first lens 110, a second lens 120, a third lens 130, an IR-cut filter 150, a cover glass 160, and an image plane 170, wherein the optical lens system has a total of three lenses with refractive power, but not limited to this. The stop 100 is disposed between the first lens 110 and an object. The image sensor 180 is disposed on the image plane 170.

The first lens 110 with positive refractive power, comprising an object-side surface 111 and an image-side surface 112, the object-side surface 111 of the first lens 110 being convex near the optical axis 190 and the image-side surface 112 of the first lens 110 being convex near the optical axis 190, the object-side surface 111 and the image-side surface 112 of the first lens 110 are aspheric, and the first lens 110 is made of plastic material.

The second lens 120 with positive refractive power, comprising an object-side surface 121 and an image-side surface 122, the object-side surface 121 of the second lens 120 being concave near the optical axis 190 and the image-side surface 122 of the second lens 120 being convex near the optical axis 190, the object-side surface 121 and the image-side surface 12 of the second lens 120 are aspheric, and the second lens 120 is made of plastic material.

The third lens 130 with negative refractive power, comprising an object-side surface 131 and an image-side surface 132, the object-side surface 131 of the third lens 130 being convex near the optical axis 190 and the image-side surface 132 of the third lens 130 being concave near the optical axis 190, the object-side surface 131 and the image-side surface 132 of the third lens 130 are aspheric, and the third lens 130 is made of plastic material.

The IR-cut filter 150 made of glass is located between the third lens 130 and the image plane 170 and has no influence on the focal length of the optical lens system.

The cover glass 160 is located between the IR-cut filter 150 and the image plane 170 and has no influence on the focal length of the optical lens system.

The equation for the aspheric surface profiles of the respective lenses of the first embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Fh^{14} + Gh^{16}$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, F, G, . . . : represent the high-order aspheric coefficients.

In the first embodiment of the present optical lens system, a focal length of the optical lens system is f, a f-number of the optical lens system is Fno, the optical lens system has a maximum view angle FOV, and following conditions are satisfied: f=1.23 mm; Fno=2.1; and FOV=78 degrees.

In the first embodiment of the present optical lens system, a distance from the image-side surface 132 of the third lens 130 to the image plane 170 along the optical axis 190 is BFL, a distance from the object-side surface 111 of the first lens 110 to the image plane 170 along the optical axis 190 is TL, and following condition is satisfied: BFL/TL=0.52.

In the first embodiment of the present optical lens system, the optical lens system has the maximum view angle FOV, the focal length of the optical lens system is f, and following condition is satisfied: FOV/f=63.31.

In the first embodiment of the present optical lens system, a distance from the stop 100 to the image-side surface 132 of the third lens 130 along the optical axis 190 is SD, the distance from the object-side surface 111 of the first lens 110 to the image plane 170 along the optical axis 190 is TL, and following condition is satisfied: SD/TL=0.46.

In the first embodiment of the present optical lens system, the focal length of the optical lens system is f, the distance from the object-side surface 111 of the first lens 110 to the image plane 170 along the optical axis 190 is TL, and following condition is satisfied: f/TL=0.72.

In the first embodiment of the present optical lens system, a radius of curvature of the object-side surface 121 of the second lens 120 is R3, an incident pupil aperture of the optical lens system is EPD, and following condition is satisfied: R3/EPD=−0.53.

In the first embodiment of the present optical lens system, a focal length of the second lens 120 is f2, the incident pupil aperture of the optical lens system is EPD, and following condition is satisfied: f2/EPD=10.09.

In the first embodiment of the present optical lens system, a distance from the object-side surface 111 of the first lens 110 to the image-side surface 132 of the third lens 130 along the optical axis 190 is TD, the distance from the object-side surface 111 of the first lens 110 to the image plane 170 along the optical axis 190 is TL, and following condition is satisfied: TD/TL=0.48.

In the first embodiment of the present optical lens system, the incident pupil aperture of the optical lens system is EPD, and following condition is satisfied: EPD=0.59.

In the first embodiment of the present optical lens system, a distance from the image-side surface 112 of the first lens 110 to the object-side surface 121 of the second lens 120 along the optical axis 190 is T12, a central thickness of the second lens 120 along the optical axis 190 is CT2, and following condition is satisfied: T12/CT2=1.05.

In the first embodiment of the present optical lens system, a focal length of the first lens 110 is f1, the focal length of the second lens 120 is f2, and following condition is satisfied: f1/f2=0.18.

In the first embodiment of the present optical lens system, the distance from the object-side surface 111 of the first lens 110 to the image-side surface 132 of the third lens 130 along the optical axis 190 is TD, the distance from the image-side surface 132 of the third lens 130 to the image plane 170 along the optical axis 190 is BFL, and following condition is satisfied: TD/BFL=0.93.

The detailed optical data of the first embodiment is shown in table 1, and the aspheric surface data is shown in table 2.

TABLE 1

Embodiment 1
f (focal length) = 1.23 mm, Fno = 2.1, FOV = 78 deg.

| surface | | Curvature Radius | | Thickness/gap | Material | Index (nd) | Abbe # (vd) | Focal length |
|---|---|---|---|---|---|---|---|---|
| 0 | object | infinity | | infinity | | | | |
| 1 | stop | infinity | | −0.041 | | | | |
| 2 | Lens 1 | 0.646 | (ASP) | 0.278 | plastic | 1.544 | 56.0 | 1.07 |
| 3 | | −5.235 | (ASP) | 0.159 | | | | |
| 4 | Lens 2 | −0.311 | (ASP) | 0.151 | plastic | 1.643 | 22.5 | 5.98 |
| 5 | | −0.343 | (ASP) | 0.041 | | | | |
| 6 | Lens 3 | 1.068 | (ASP) | 0.197 | plastic | 1.544 | 56.0 | −4.24 |
| 7 | | 0.683 | (ASP) | 0.163 | | | | |
| 8 | IR-cut filter | infinity | | 0.145 | glass | 1.517 | 64.2 | — |
| 9 | | infinity | | 0.130 | | | | |
| 10 | cover glass | infinity | | 0.400 | glass | 1.517 | 64.2 | — |
| 11 | | infinity | | 0.050 | | | | |
| 12 | Image plane | infinity | | — | | | | |

Note:
reference wavelength is 555 nm

TABLE 2

Aspheric Coefficients

| surface | 2 | 3 | 4 | 5 | 6 | 7 |
|---|---|---|---|---|---|---|
| K: | −2.2107E+00 | 5.2655E+01 | −1.3697E+00 | −2.7670E+00 | 3.0015E+00 | −1.4664E+01 |
| A: | −3.6184E−01 | −1.3449E+00 | 5.2431E−01 | −2.1613E+00 | −3.3207E+00 | −1.3399E+00 |
| B: | 2.2631E+01 | −2.6543E+01 | 1.2367E+01 | 4.0152E+01 | 8.9137E+00 | 2.2055E+00 |
| C: | −3.2007E+02 | 7.3003E+01 | 3.8271E+02 | 4.1938E+01 | −3.3493E+01 | −2.8739E+00 |
| D: | −1.9332E+02 | 5.9742E+02 | −2.3342E+03 | 2.5056E+02 | −1.4870E+01 | −1.3944E+01 |
| E: | −4.9477E+03 | −1.7981E+03 | −1.6740E+03 | −3.4501E+03 | 2.4488E+02 | 6.6198E+00 |
| F: | 3.6330E+05 | −6.2904E+03 | 6.8906E+03 | −1.4801E+03 | −5.2787E+02 | 1.2946E+02 |
| G: | −2.2540E+06 | −6.9140E+04 | 7.2540E+04 | −2.1672E+03 | −1.5576E+02 | −2.6311E+02 |

The units of the radius of curvature, the thickness and the focal length in table 1 are expressed in mm, the surface numbers 0-12 represent the surfaces sequentially arranged from the object-side to the image-side along the optical axis, wherein surface 0 represents a gap between the object and the stop 100 along the optical axis 190, surface 1 represents a gap between the stop 100 and the object-side surface 111 of the first lens 110 along the optical axis 190, the stop 110 is farther away from the object-side than the object-side surface 111 of the first lens 110, so it is expressed as a negative value, surfaces 2, 4, 6, 8, 10 are thicknesses of the first lens 110, the second lens 120, the third lens 130, the cover glass 160, and the IR-cut filter 150 along the optical axis 190, respectively, surface 3 represents a gap between the first lens 110 and the second lens 120 along the optical axis 190, surface 5 represents a gap between the second lens 120 and the third lens 130 along the optical axis 190, surface 7 represents a gap between the third lens 130 and the IR-cut filter 150 along the optical axis 190, surface 9 represents a gap between the IR-cut filter 150 and the cover glass 160 along the optical axis 190, surface 11 represents a gap between the cover glass 160 and the image plane 170 along the optical axis 190. In table 2, k represents the conic coefficient of the equation of the aspheric surface profiles, and A, B, C, D, E, F, G . . . : represent the high-order aspheric coefficients. The tables presented below for each embodiment are the corresponding schematic parameter and image plane curves, and the definitions of the tables are the same as Table 1 and Table 2 of the first embodiment. Therefore, an explanation in this regard will not be provided again.

Figure 2A:
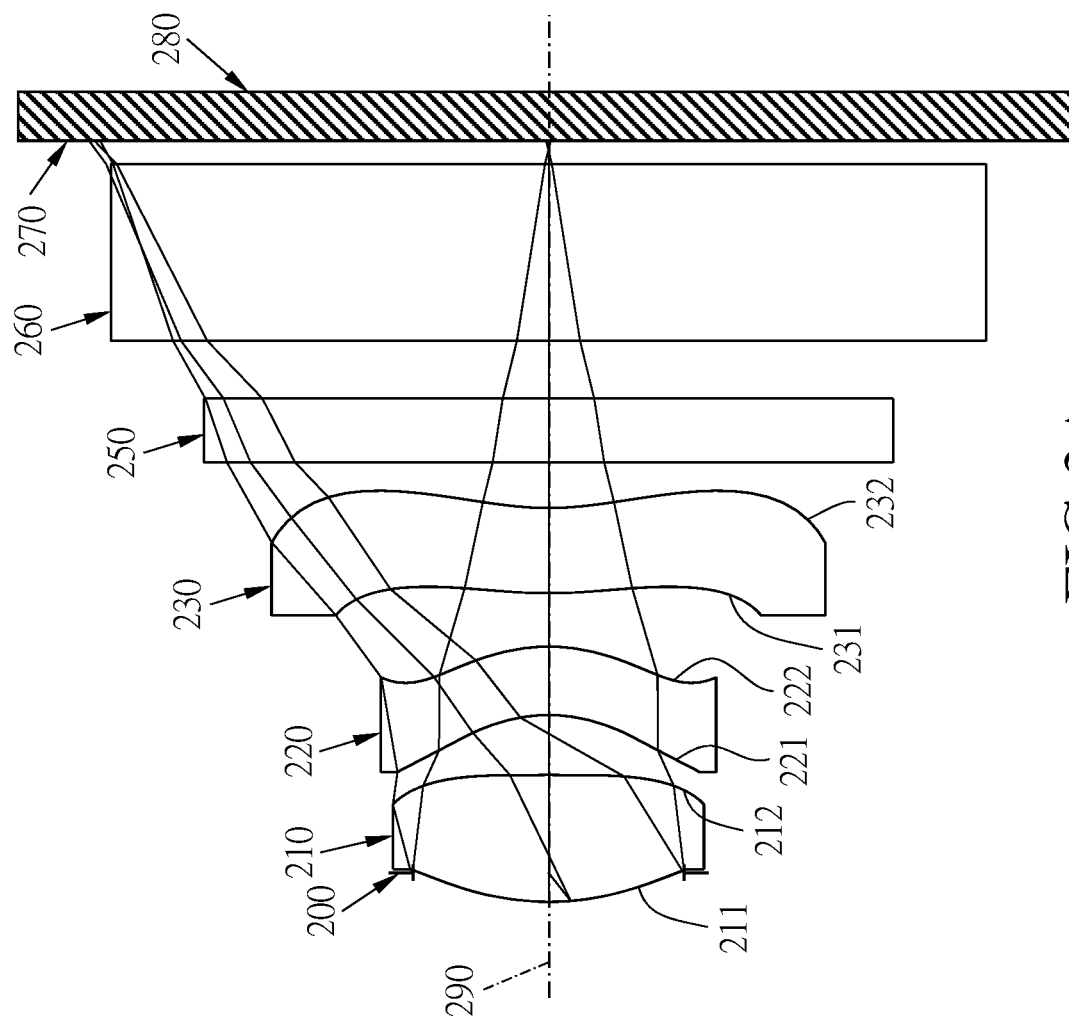
FIG. 2A shows an optical lens system in accordance with a second embodiment of the present invention.
Figure 2B:
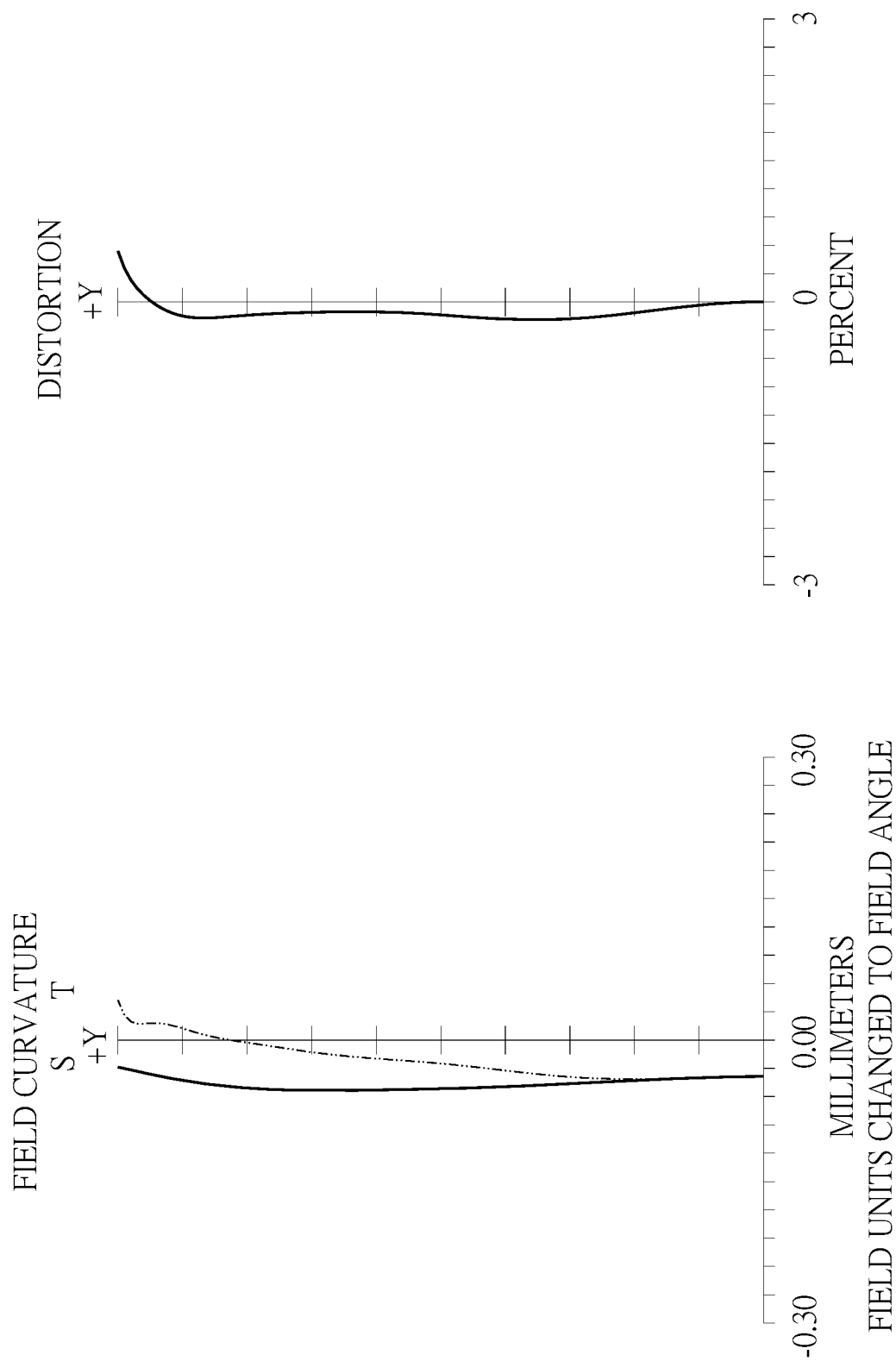
FIG. 2B shows the image plane curve and the distortion curve of the second embodiment of the present invention.

Referring to FIGS. 2A and 2B, FIG. 2A shows an optical lens system in accordance with a second embodiment of the present invention, and FIG. 2B shows, in order from left to right, the image plane curve and the distortion curve of the second embodiment of the present invention. An optical lens system in accordance with the second embodiment of the present invention comprises a stop 200 and a lens group. The optical lens system is provided with an image sensor 280. The lens group comprises, in order from an object side to an image side along an optical axis 290: a first lens 210, a second lens 220, a third lens 230, an IR-cut filter 250, a cover glass 260, and an image plane 270, wherein the optical lens system has a total of three lenses with refractive power, but not limited to this. The stop 200 is disposed between the first lens 210 and an object. The image sensor 280 is disposed on the image plane 270.

The first lens 210 with positive refractive power, comprising an object-side surface 211 and an image-side surface 212, the object-side surface 211 of the first lens 210 being convex near the optical axis 290 and the image-side surface 212 of the first lens 210 being convex near the optical axis 290, the object-side surface 211 and the image-side surface 212 of the first lens 210 are aspheric, and the first lens 210 is made of plastic material.

The second lens 220 with positive refractive power, comprising an object-side surface 221 and an image-side surface 222, the object-side surface 221 of the second lens 220 being concave near the optical axis 290 and the image-side surface 222 of the second lens 220 being convex near the optical axis 290, the object-side surface 221 and the image-side surface 222 of the second lens 220 are aspheric, and the second lens 220 is made of plastic material.

The third lens 230 with negative refractive power, comprising an object-side surface 231 and an image-side surface 232, the object-side surface 231 of the second lens 230 being convex near the optical axis 290 and the image-side surface 232 of the second lens 230 being concave near the optical axis 290, the object-side surface 231 and the image-side surface 232 of the second lens 230 are aspheric, and the third lens 230 is made of plastic material.

The IR-cut filter 250 made of glass is located between the third lens 230 and the image plane 270 and has no influence on the focal length of the optical lens system.

The cover glass 260 is located between the IR-cut filter 250 and the image plane 270 and has no influence on the focal length of the optical lens system.

The detailed optical data of the second embodiment is shown in table 3, and the aspheric surface data is shown in table 4.

TABLE 3

Embodiment 2
f (focal length) = 1.26 mm, Fno = 2.1, FOV = 76 deg.

| surface | | Curvature Radius | | Thickness/ gap | Material | Index (nd) | Abbe # (vd) | Focal length |
|---|---|---|---|---|---|---|---|---|
| 0 | object | infinity | | infinity | | | | |
| 1 | stop | infinity | | −0.066 | | | | |
| 2 | Lens 1 | 0.595 | (ASP) | 0.288 | plastic | 1.544 | 56.0 | 1.02 |
| 3 | | −7.403 | (ASP) | 0.135 | | | | |
| 4 | Lens 2 | −0.365 | (ASP) | 0.155 | plastic | 1.643 | 22.5 | 109.80 |
| 5 | | −0.423 | (ASP) | 0.121 | | | | |
| 6 | Lens 3 | 1.114 | (ASP) | 0.193 | plastic | 1.544 | 56.0 | −4.76 |
| 7 | | 0.732 | (ASP) | 0.103 | | | | |
| 8 | IR-cut filter | infinity | | 0.145 | glass | 1.517 | 64.2 | — |
| 9 | | infinity | | 0.130 | | | | |
| 10 | cover glass | infinity | | 0.400 | glass | 1.517 | 64.2 | — |
| 11 | | infinity | | 0.050 | | | | |
| 12 | Image plane | infinity | | — | | | | |

Note:
reference wavelength is 555 nm

TABLE 4

Aspheric Coefficients

| surface | 2 | 3 | 4 | 5 | 6 | 7 |
|---|---|---|---|---|---|---|
| K: | −1.6053E+00 | 6.3351E+01 | −8.8292E−01 | −2.7475E+00 | 2.7352E+00 | −1.0890E+01 |
| A: | −8.5255E−01 | −1.3898E+00 | −1.3801E+00 | −3.2866E+00 | −5.1094E+00 | −1.8046E+00 |
| B: | 4.2525E+01 | −3.6562E+01 | 1.6213E+01 | 4.4679E+01 | 2.3024E+01 | 4.2517E+00 |
| C: | −6.8305E+02 | 1.9974E+02 | 7.6463E+02 | 4.9672E+01 | −8.6378E+01 | −9.1283E+00 |
| D: | 5.0635E+03 | 6.5645E+02 | −6.0966E+03 | 6.9302E+02 | 1.0846E+01 | 7.5839E+00 |
| E: | −5.4650E+04 | −6.2402E+03 | 2.6883E+03 | −7.7977E+03 | 6.1827E+02 | −6.9477E+01 |
| F: | 6.3839E+05 | −6.8920E+04 | 5.6132E+04 | 5.5869E+03 | −3.8048E+02 | 3.1037E+02 |
| G: | −3.0640E+06 | 2.8933E+05 | −1.9440E+05 | −1.0170E+04 | −5.1441E+03 | −4.5063E+02 |

In the second embodiment, the equation of the aspheric surface profiles of the aforementioned lenses is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 1.26 | FOV/f | 60.15 |
| Fno | 2.08 | TD/TL | 0.52 |
| FOV[deg.] | 76.00 | BFL/TL | 0.48 |
| EPD | 0.61 | TD/BFL | 1.08 |
| f1/f2 | 0.01 | f2/EPD | 180.70 |
| f/TL | 0.74 | R3/EPD | −0.60 |
| T12/CT2 | 0.87 | SD/TL | 0.48 |

Figure 3A:
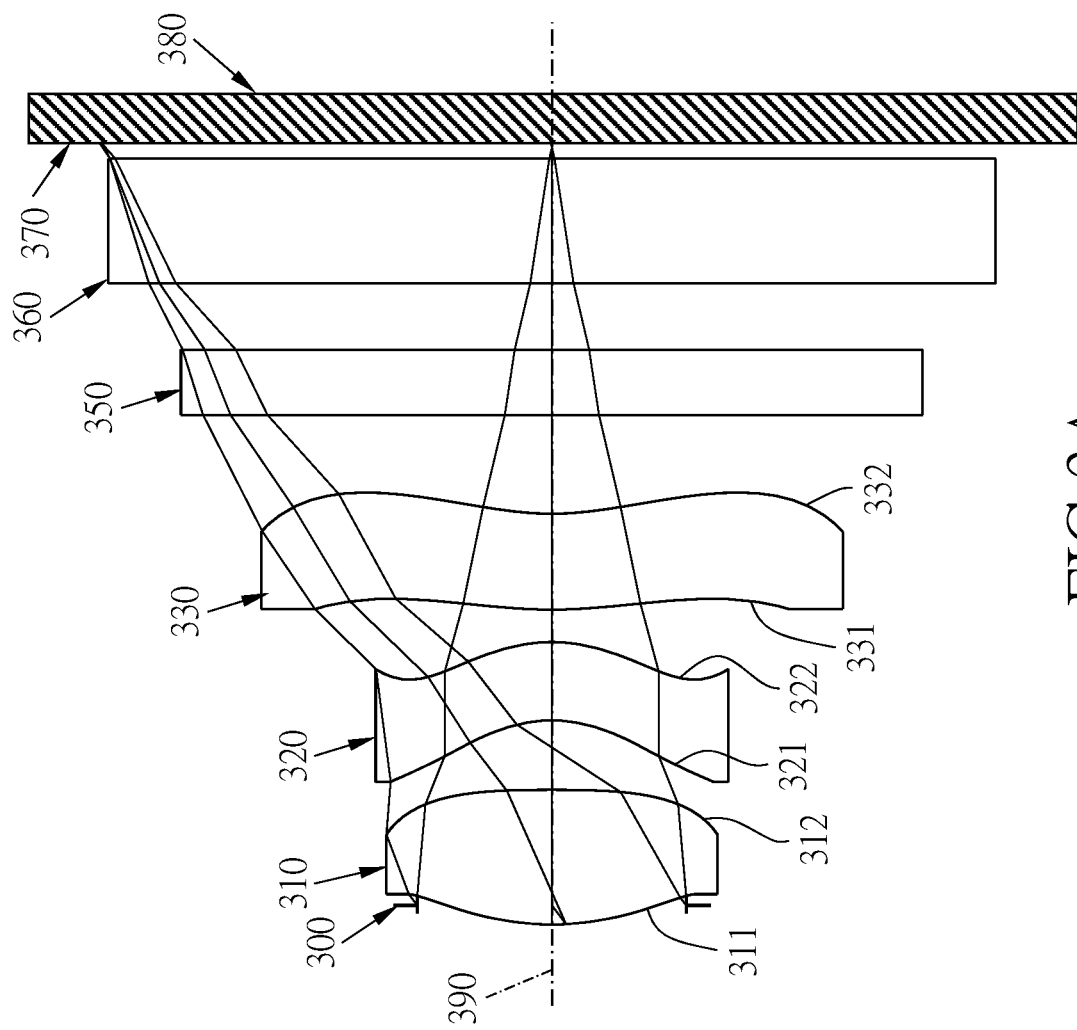
FIG. 3A shows an optical lens system in accordance with a third embodiment of the present invention.
Figure 3B:
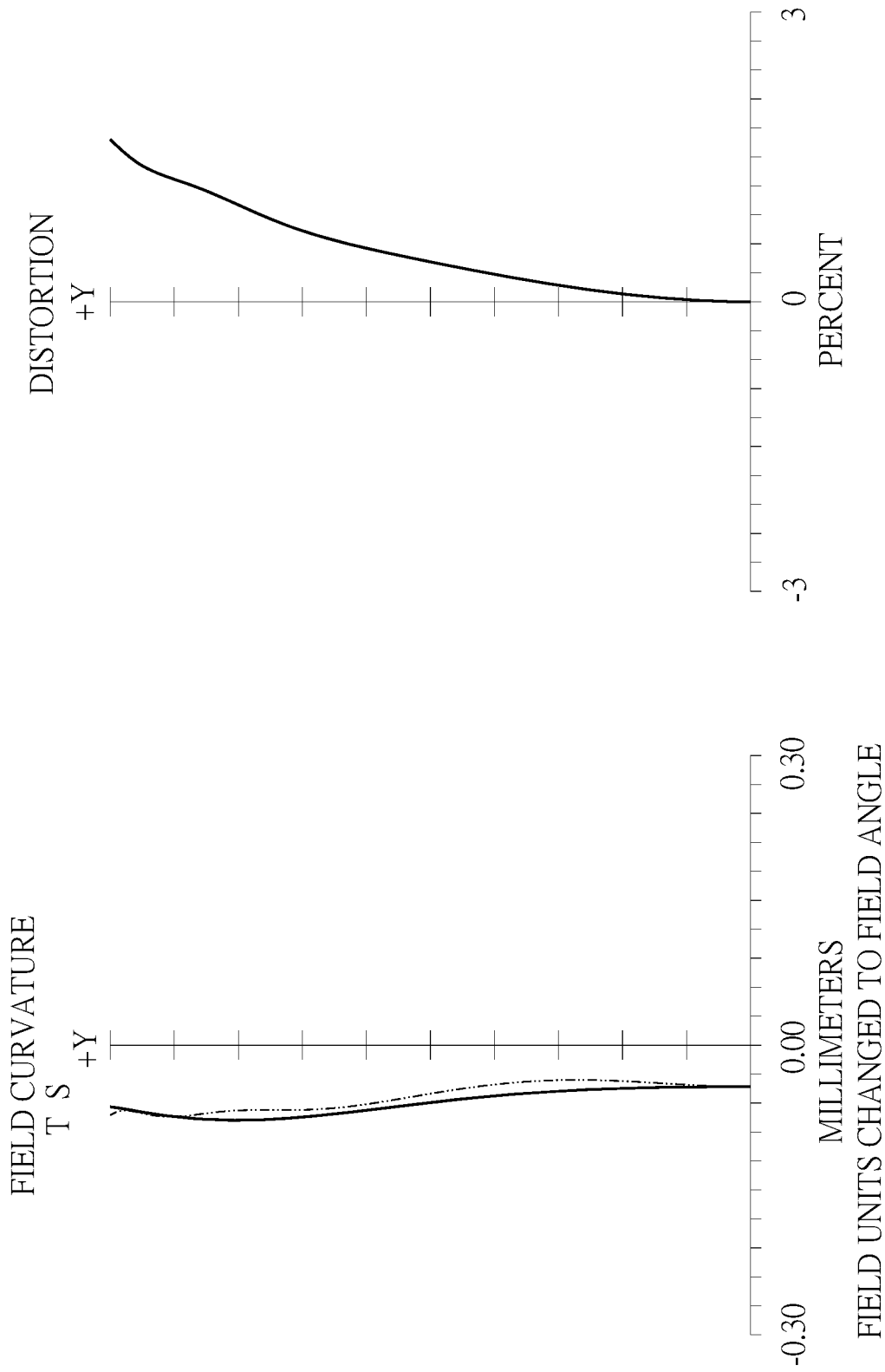
FIG. 3B shows the image plane curve and the distortion curve of the third embodiment of the present invention.

Referring to FIGS. 3A and 3B, FIG. 3A shows an optical lens system in accordance with a third embodiment of the present invention, and FIG. 3B shows, in order from left to right, the image plane curve and the distortion curve of the third embodiment of the present invention. An optical lens system in accordance with the third embodiment of the present invention comprises a stop 300 and a lens group. The optical lens system is provided with an image sensor 380. The lens group comprises, in order from an object side to an image side along an optical axis 390: a first lens 310, a second lens 320, a third lens 330, an IR-cut filter 350, a cover glass 360, and an image plane 370, wherein the optical lens system has a total of three lenses with refractive power, but not limited to this. The stop 300 is disposed between the first lens 310 and an object. The image sensor 380 is disposed on the image plane 370.

The first lens 310 with positive refractive power, comprising an object-side surface 311 and an image-side surface 312, the object-side surface 311 of the first lens 310 being convex near the optical axis 390 and the image-side surface 312 of the first lens 310 being convex near the optical axis 390, the object-side surface 311 and the image-side surface 312 of the first lens 310 are aspheric, and the first lens 310 is made of plastic material.

The second lens 320 with positive refractive power, comprising an object-side surface 321 and an image-side surface 322, the object-side surface 321 of the second lens 320 being concave near the optical axis 390 and the image-side surface 322 of the second lens 320 being convex near the optical axis 390, the object-side surface 321 and the image-side surface 322 of the second lens 320 are aspheric, and the second lens 320 is made of plastic material.

The third lens 330 with negative refractive power, comprising an object-side surface 331 and an image-side surface 332, the object-side surface 331 of the third lens 330 being convex near the optical axis 390 and the image-side surface 332 of the third lens 330 being concave near the optical axis 390, the object-side surface 331 and the image-side surface 332 of the third lens 330 are aspheric, and the third lens 330 is made of plastic material.

The IR-cut filter 350 made of glass is located between the third lens 330 and the image plane 370 and has no influence on the focal length of the optical lens system.

The cover glass 360 is located between the IR-cut filter 350 and the image plane 370 and has no influence on the focal length of the optical lens system.

The detailed optical data of the third embodiment is shown in table 5, and the aspheric surface data is shown in table 6.

TABLE 5

Embodiment 3
f(focal length) = 1.85 mm, Fno = 2.1, FOV = 75.7 deg.

| surface | | Curvature Radius | Thickness/gap | Material | Index(nd) | Abbe #(vd) | Focal length |
|---|---|---|---|---|---|---|---|
| 0 | object | infinity | infinity | | | | |
| 1 | stop | infinity | −0.061 | | | | |
| 2 | Lens 1 | 0.946 (ASP) | 0.432 | plastic | 1.544 | 56.0 | 1.50 |
| 3 | | −5.113 (ASP) | 0.223 | | | | |
| 4 | Lens 2 | −0.486 (ASP) | 0.252 | plastic | 1.643 | 22.5 | 13.50 |
| 5 | | −0.555 (ASP) | 0.103 | | | | |
| 6 | Lens 3 | 1.766 (ASP) | 0.308 | plastic | 1.544 | 56.0 | −5.49 |
| 7 | | 1.043 (ASP) | 0.317 | | | | |
| 8 | IR-cut filter | infinity | 0.210 | glass | 1.517 | 64.2 | — |
| 9 | | infinity | 0.213 | | | | |
| 10 | cover glass | infinity | 0.400 | glass | 1.517 | 64.2 | — |
| 11 | | infinity | 0.05 | | | | |
| 12 | Image plane | infinity | — | | | | |

Note:
reference wavelength is 555 nm

TABLE 6

Aspheric Coefficients

| surface | 2 | 3 | 4 | 5 | 6 | 7 |
|---|---|---|---|---|---|---|
| K: | −2.6209E+00 | 7.8280E+01 | −1.3070E+00 | −3.4063E+00 | 2.7909E+00 | −1.2795E+01 |
| A: | −1.4684E−01 | −5.7180E−01 | 8.8950E−02 | −7.9572E−01 | −9.1515E−01 | −3.7564E−01 |
| B: | 3.6932E+00 | −2.6278E+00 | 2.3264E+00 | 6.0355E+00 | 1.3825E+00 | 2.4478E−01 |
| C: | −2.2747E+01 | 5.9302E+00 | 2.6268E+01 | 3.3890E+00 | −2.2079E+00 | −2.7100E−02 |
| D: | −1.1722E+01 | 1.4351E+01 | −9.1885E+01 | 4.0128E+00 | 3.8123E−01 | −3.4150E−01 |
| E: | −1.7950E+01 | −6.6060E+01 | −3.3623E+01 | −6.5855E+01 | 3.8495E+00 | 2.0840E−02 |
| F: | 2.6525E+03 | −9.0278E+01 | 8.7620E+01 | −1.0922E+01 | −5.0195E+00 | 4.7659E−01 |
| G: | −8.6557E+03 | 1.5454E+02 | 3.8244E+02 | 1.1709E+02 | 1.7318E+00 | −3.2344E−01 |

In the third embodiment, the equation of the aspheric surface profiles of the aforementioned lenses is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

Embodiment 3

| f[mm] | 1.85 | FOV/f | 40.85 |
|---|---|---|---|
| Fno | 2.08 | TD/TL | 0.52 |
| FOV[deg.] | 75.70 | BFL/TL | 0.47 |
| EPD | 0.89 | TD/BFL | 1.11 |
| f1/f2 | 0.11 | f2/EPD | 15.15 |
| f/TL | 0.74 | R3/EPD | −0.55 |
| T12/CT2 | 0.88 | SD/TL | 0.50 |

Figure 4A:
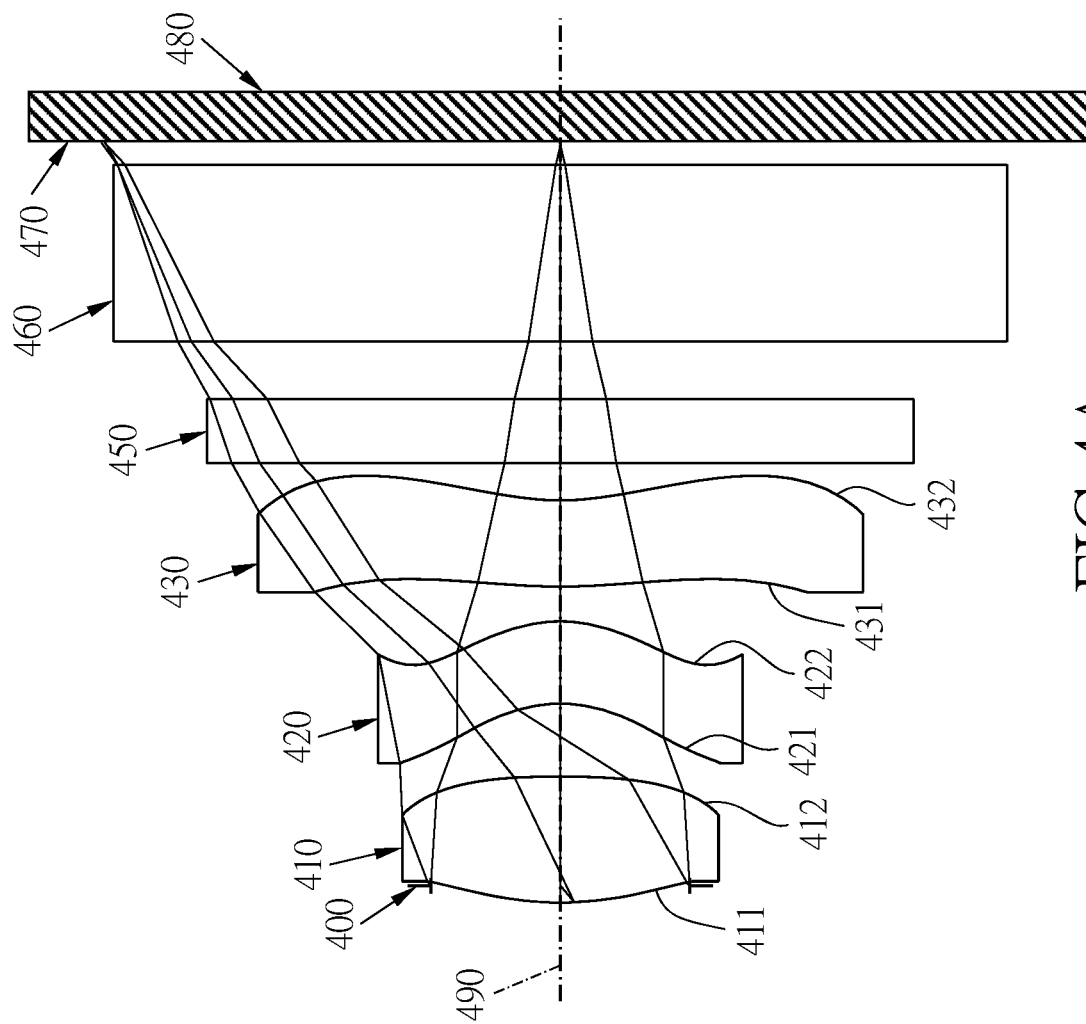
FIG. 4A shows an optical lens system in accordance with a fourth embodiment of the present invention.
Figure 4B:
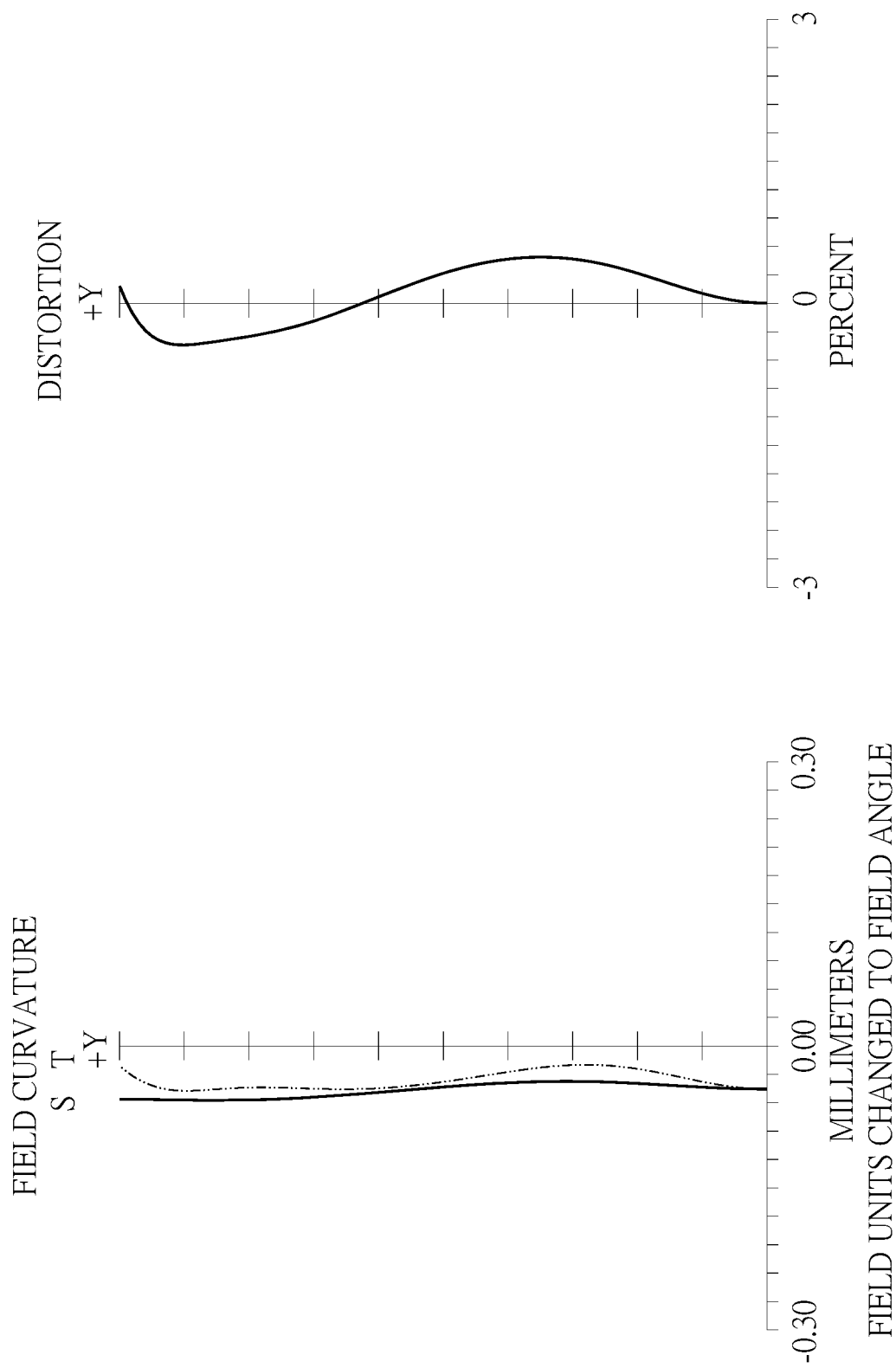
FIG. 4B shows the image plane curve and the distortion curve of the fourth embodiment of the present invention.

Referring to FIGS. 4A and 4B, FIG. 4A shows an optical lens system in accordance with a fourth embodiment of the present invention, and FIG. 4B shows, in order from left to right, the image plane curve and the distortion curve of the fourth embodiment of the present invention. An optical lens system in accordance with the fourth embodiment of the present invention comprises a stop 400 and a lens group. The optical lens system is provided with an image sensor 480. The lens group comprises, in order from an object side to an image side along an optical axis 490: a first lens 410, a second lens 420, a third lens 430, an IR-cut filter 450, a cover glass 460, and an image plane 470, wherein the optical lens system has a total of three lenses with refractive power, but not limited to this. The stop 400 is disposed between the first lens 410 and an object. The image sensor 480 is disposed on the image plane 470.

The first lens 410 with a positive refractive power has an object-side surface 411 being convex near the optical axis 490 and an image-side surface 412 being convex near the optical axis 490, the object-side surface 411 and the image-side surface 412 are aspheric, and the first lens 410 is made of plastic material.

The second lens 420 with positive refractive power, comprising an object-side surface 421 and an image-side surface 422, the object-side surface 421 of the first lens 420 being concave near the optical axis 490 and the image-side surface 422 of the first lens 420 being convex near the optical axis 490, the object-side surface 421 and the image-side surface 422 of the first lens 420 are aspheric, and the second lens 420 is made of plastic material.

The third lens 430 with negative refractive power, comprising an object-side surface 431 and an image-side surface 432, the object-side surface 431 of the third lens 430 being convex near the optical axis 490 and the image-side surface 432 of the third lens 430 being concave near the optical axis 490, the object-side surface 431 and the image-side surface 432 of the third lens 430 are aspheric, and the third lens 430 is made of plastic material.

The IR-cut filter 450 made of glass is located between the third lens 430 and the image plane 470 and has no influence on the focal length of the optical lens system.

The cover glass 460 is located between the IR-cut filter 450 and the image plane 470 and has no influence on the focal length of the optical lens system.

The detailed optical data of the fourth embodiment is shown in table 7, and the aspheric surface data is shown in table 8.

TABLE 7

Embodiment 4
f(focal length) = 1.2 mm, Fno = 2.1, FOV = 78.7 deg.

| surface | | Curvature Radius | Thickness/gap | Material | Index(nd) | Abbe #(vd) | Focal length |
|---|---|---|---|---|---|---|---|
| 0 | object | infinity | infinity | | | | |
| 1 | stop | infinity | −0.038 | | | | |
| 2 | Lens 1 | 0.721 (ASP) | 0.285 | plastic | 1.544 | 56.0 | 1.02 |
| 3 | | −2.109 (ASP) | 0.165 | | | | |
| 4 | Lens 2 | −0.331 (ASP) | 0.187 | plastic | 1.544 | 56.0 | 2.95 |
| 5 | | −0.329 (ASP) | 0.079 | | | | |
| 6 | Lens 3 | 1.401 (ASP) | 0.195 | plastic | 1.544 | 56.0 | −2.09 |
| 7 | | 0.598 (ASP) | 0.084 | | | | |
| 8 | IR-cut filter | infinity | 0.145 | glass | 1.517 | 64.2 | — |
| 9 | | infinity | 0.130 | | | | |
| 10 | cover glass | infinity | 0.400 | glass | 1.517 | 64.2 | — |

TABLE 7-continued

Embodiment 4
f(focal length) = 1.2 mm, Fno = 2.1, FOV = 78.7 deg.

| surface | | Curvature Radius | Thickness/gap | Material | Index(nd) | Abbe #(vd) | Focal length |
|---|---|---|---|---|---|---|---|
| 11 | | infinity | 0.050 | | | | |
| 12 | Image plane | infinity | — | | | | |

Note:
reference wavelength is 555 nm

TABLE 8

Aspheric Coefficients

| surface | 2 | 3 | 4 | 5 | 6 | 7 |
|---|---|---|---|---|---|---|
| K: | −7.3681E+00 | 2.4580E+01 | −9.7884E−01 | −3.6797E+00 | 2.7071E+00 | −1.0466E+01 |
| A: | 5.2030E−02 | −1.8664E+00 | −5.9509E−01 | −4.7926E+00 | −2.6972E+00 | −1.4048E+00 |
| B: | 3.4565E+01 | −1.8272E+01 | 2.0953E+01 | 5.1050E+01 | 8.7477E+00 | 2.9759E+00 |
| C: | −5.8406E+02 | 9.3994E+01 | 5.8700E+02 | 9.7087E+01 | −2.2301E+01 | −4.4865E+00 |
| D: | −1.1821E+03 | 6.6402E+02 | −3.6009E+03 | 3.5696E+01 | −2.3357E+01 | −2.9170E+00 |
| E: | 2.4910E+04 | −1.9859E+03 | −6.9570E+03 | −5.4133E+03 | 3.0097E+02 | 7.1630E+00 |
| F: | 5.5585E+05 | −4.8690E+04 | 2.2021E+04 | −1.1480E+04 | −6.9620E+02 | 1.2846E+01 |
| G: | −5.2280E+06 | 8.3694E+04 | 1.4661E+05 | 9.1373E+04 | 5.5261E+02 | −2.6628E+01 |

In the fourth embodiment, the equation of the aspheric surface profiles of the aforementioned lenses is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 1.20 | FOV/f | 65.41 |
| Fno | 2.08 | TD/TL | 0.53 |
| FOV[deg.] | 78.70 | BFL/TL | 0.47 |
| EPD | 0.58 | TD/BFL | 1.12 |
| f1/f2 | 0.35 | f2/EPD | 5.10 |
| f/TL | 0.70 | R3/EPD | −0.57 |
| T12/CT2 | 0.89 | SD/TL | 0.50 |

Figure 5A:
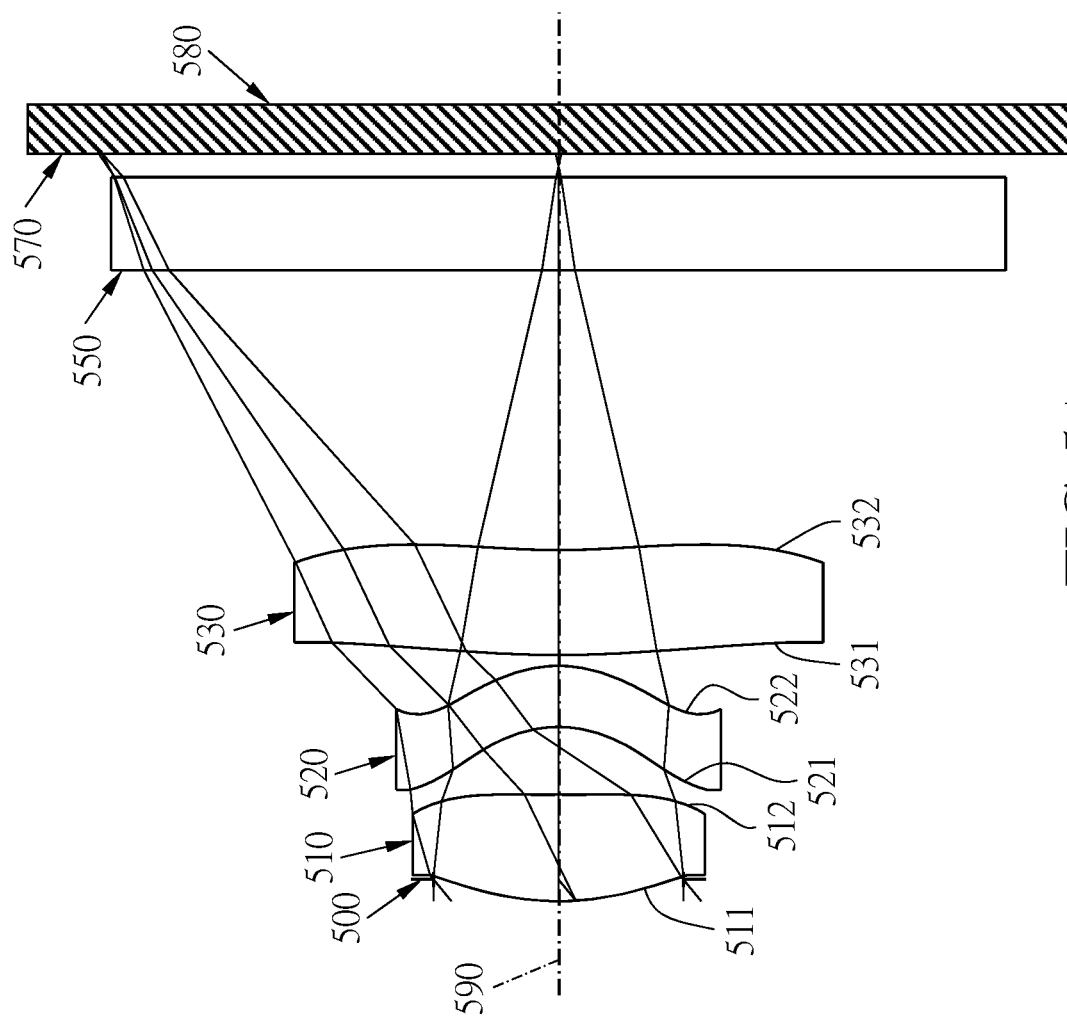
FIG. 5A shows an optical lens system in accordance with a fifth embodiment of the present invention.
Figure 5B:
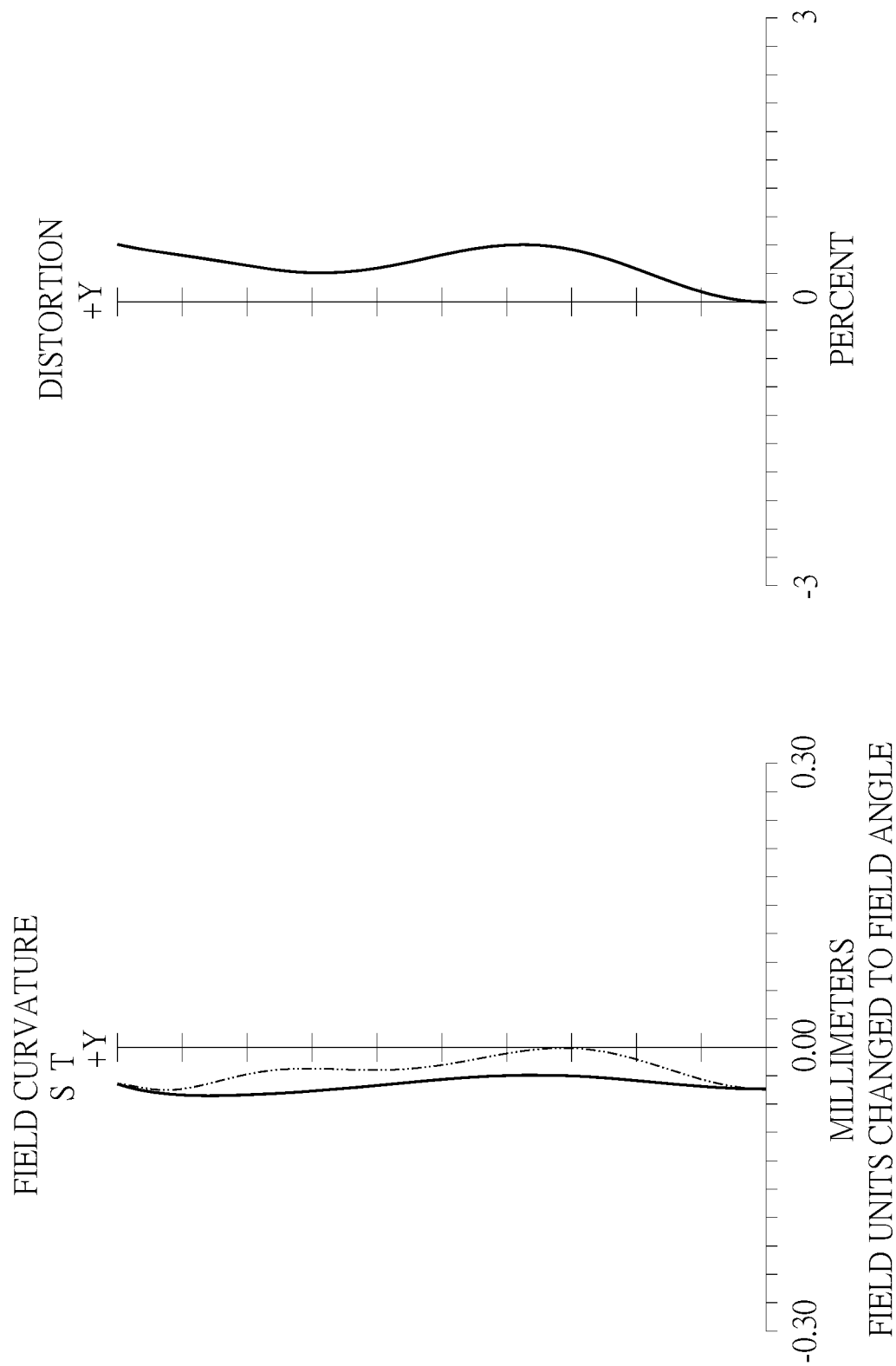
FIG. 5B shows the image plane curve and the distortion curve of the fifth embodiment of the present invention.

Referring to FIGS. 5A and 5B, FIG. 5A shows an optical lens system in accordance with a fifth embodiment of the present invention, and FIG. 5B shows, in order from left to right, the image plane curve and the distortion curve of the fifth embodiment of the present invention. An optical lens system in accordance with the fifth embodiment of the present invention comprises a stop 500 and a lens group. The optical lens system is provided with an image sensor 580. The lens group comprises, in order from an object side to an image side along an optical axis 590: a first lens 510, a second lens 520, a third lens 530, an IR-cut filter 550, and an image plane 570, wherein the optical lens system has a total of three lenses with refractive power, but not limited to this. The stop 500 is disposed between the first lens 510 and an object. The image sensor 580 is disposed on the image plane 570.

The first lens 510 with positive refractive power, comprising an object-side surface 511 and an image-side surface 512, the object-side surface 511 of the first lend 510 being convex near the optical axis 590 and the image-side surface 512 of the first lens 510 being concave near the optical axis 590, the object-side surface 511 and the image-side surface 512 of the first lens 510 are aspheric, and the first lens 510 is made of plastic material.

The second lens 520 with positive refractive power, comprising an object-side surface 521 and an image-side surface 522, the object-side surface 521 of the second lens 520 being concave near the optical axis 590 and the image-side surface 522 of the second lens 520 being convex near the optical axis 590, the object-side surface 521 and the image-side surface 522 of the second lens 520 are aspheric, and the second lens 520 is made of plastic material.

The third lens 530 with negative refractive power, comprising an object-side surface 531 and an image-side surface 532, the object-side surface 531 of the third lens 530 being convex near the optical axis 590 and the image-side surface 532 of the third lens 530 being concave near the optical axis 590, the object-side surface 531 and the image-side surface 532 of the third lens 530 are aspheric, and the third lens 530 is made of plastic material.

The IR-cut filter 550 made of glass is located between the third lens 530 and the image plane 570 and has no influence on the focal length of the optical lens system.

The detailed optical data of the fifth embodiment is shown in table 9, and the aspheric surface data is shown in table 10.

TABLE 9

Embodiment 5
f(focal length) = 1.22 mm, Fno = 2.2, FOV = 78 deg.

| surface | | Curvature Radius | Thickness/gap | Material | Index(nd) | Abbe #(vd) | Focal length |
|---|---|---|---|---|---|---|---|
| 0 | object | infinity | infinity | | | | |
| 1 | stop | infinity | −0.049 | | | | |
| 2 | Lens 1 | 0.638 (ASP) | 0.241 | plastic | 1.544 | 56.0 | 1.25 |
| 3 | | 8.318 (ASP) | 0.153 | | | | |
| 4 | Lens 2 | −0.283 (ASP) | 0.138 | plastic | 1.643 | 22.5 | 3.47 |
| 5 | | −0.299 (ASP) | 0.025 | | | | |
| 6 | Lens 3 | 2.373 (ASP) | 0.237 | plastic | 1.544 | 56.0 | −8.29 |
| 7 | | 1.502 (ASP) | 0.634 | | | | |
| 8 | IR-cut filter | infinity | 0.210 | glass | 1.517 | 64.2 | — |
| 9 | infinity | | 0.050 | | | | |
| 10 | Image plane | infinity | — | | | | |

Note:
reference wavelength is 555 nm

TABLE 10

Aspheric Coefficients

| surface | 2 | 3 | 4 | 5 | 6 | 7 |
|---|---|---|---|---|---|---|
| K: | −5.3259E+00 | 4.8645E+02 | −5.2581E−01 | −2.9699E+00 | 1.2916E+01 | −4.7695E+01 |
| A: | 8.4770E−01 | −2.3605E+00 | −7.2510E−01 | −6.5713E+00 | −8.3139E−01 | −1.8677E+00 |
| B: | 4.2960E+01 | −2.5585E+01 | 4.4675E+01 | 5.1545E+01 | 2.9802E+00 | 1.0621E+01 |
| C: | −1.1677E+03 | −1.5862E+02 | 1.0083E+03 | 3.2966E+02 | −1.0549E+01 | −4.1973E+01 |
| D: | 7.8794E+03 | 2.2662E+03 | −1.0090E+03 | 1.2557E+03 | −8.5934E+00 | 7.0757E+01 |
| E: | 8.0877E+04 | 5.8761E+03 | −1.0900E+05 | −1.8620E+04 | 3.8486E+01 | 6.7321E+01 |
| F: | −1.7190E+06 | −1.7570E+04 | 7.4730E+05 | −7.1720E+04 | 2.9541E+02 | −4.8144E+02 |
| G: | 7.9675E+06 | −6.2700E+05 | −1.4730E+06 | 4.8428E+05 | −6.4886E+02 | 5.7539E+02 |

In the fifth embodiment, the equation of the aspheric surface profiles of the aforementioned lenses is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

Embodiment 5

| | | | |
|---|---|---|---|
| f[mm] | 1.22 | FOV/f | 63.98 |
| Fno | 2.18 | TD/TL | 0.47 |
| FOV[deg.] | 78.00 | BFL/TL | 0.53 |
| EPD | 0.56 | TD/BFL | 0.88 |
| f1/f2 | 0.36 | f2/EPD | 6.20 |
| f/TL | 0.72 | R3/EPD | −0.51 |
| T12/CT2 | 1.11 | SD/TL | 0.44 |

Figure 6A:
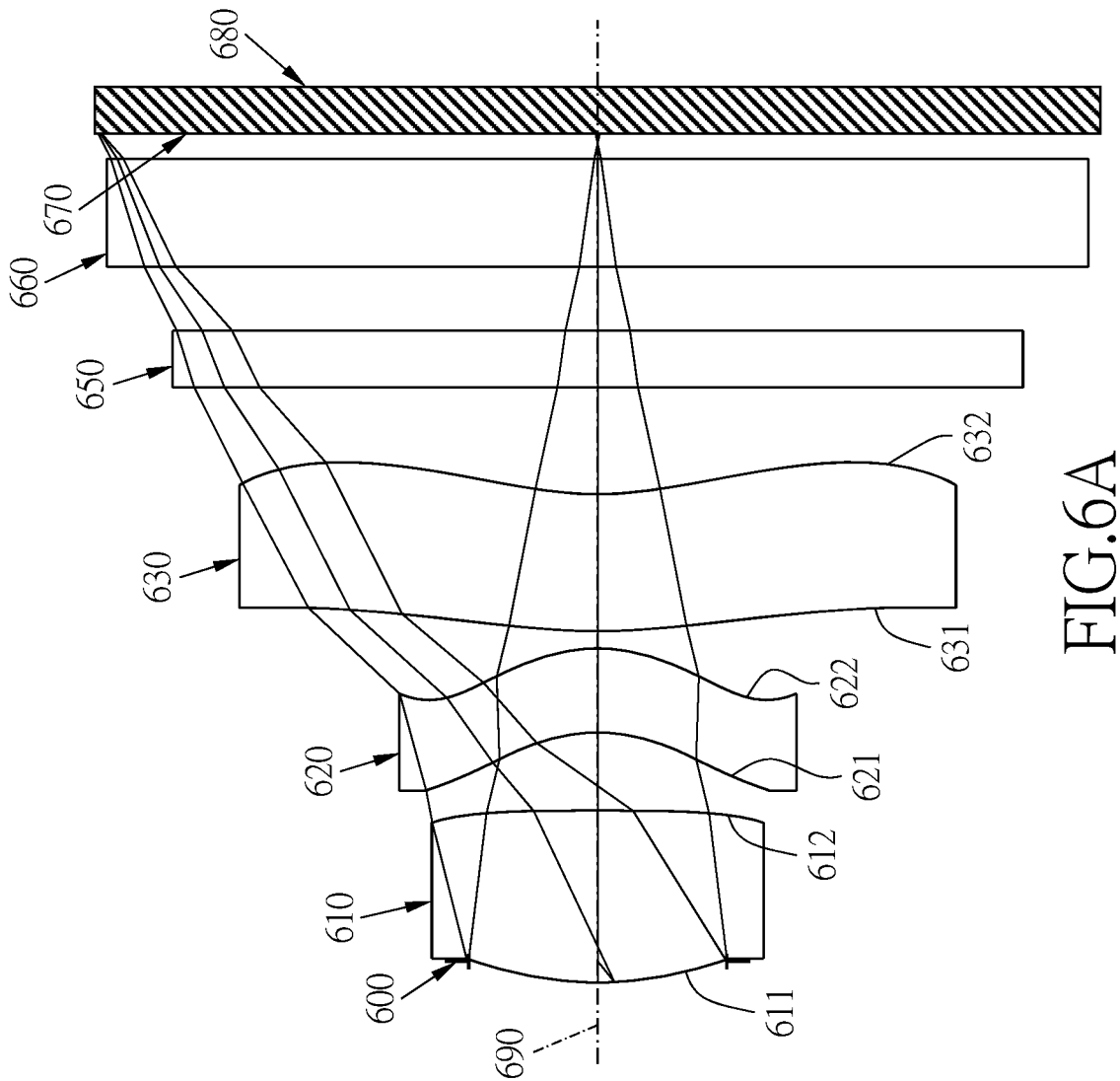
FIG. 6A shows an optical lens system in accordance with a sixth embodiment of the present invention.
Figure 6B:
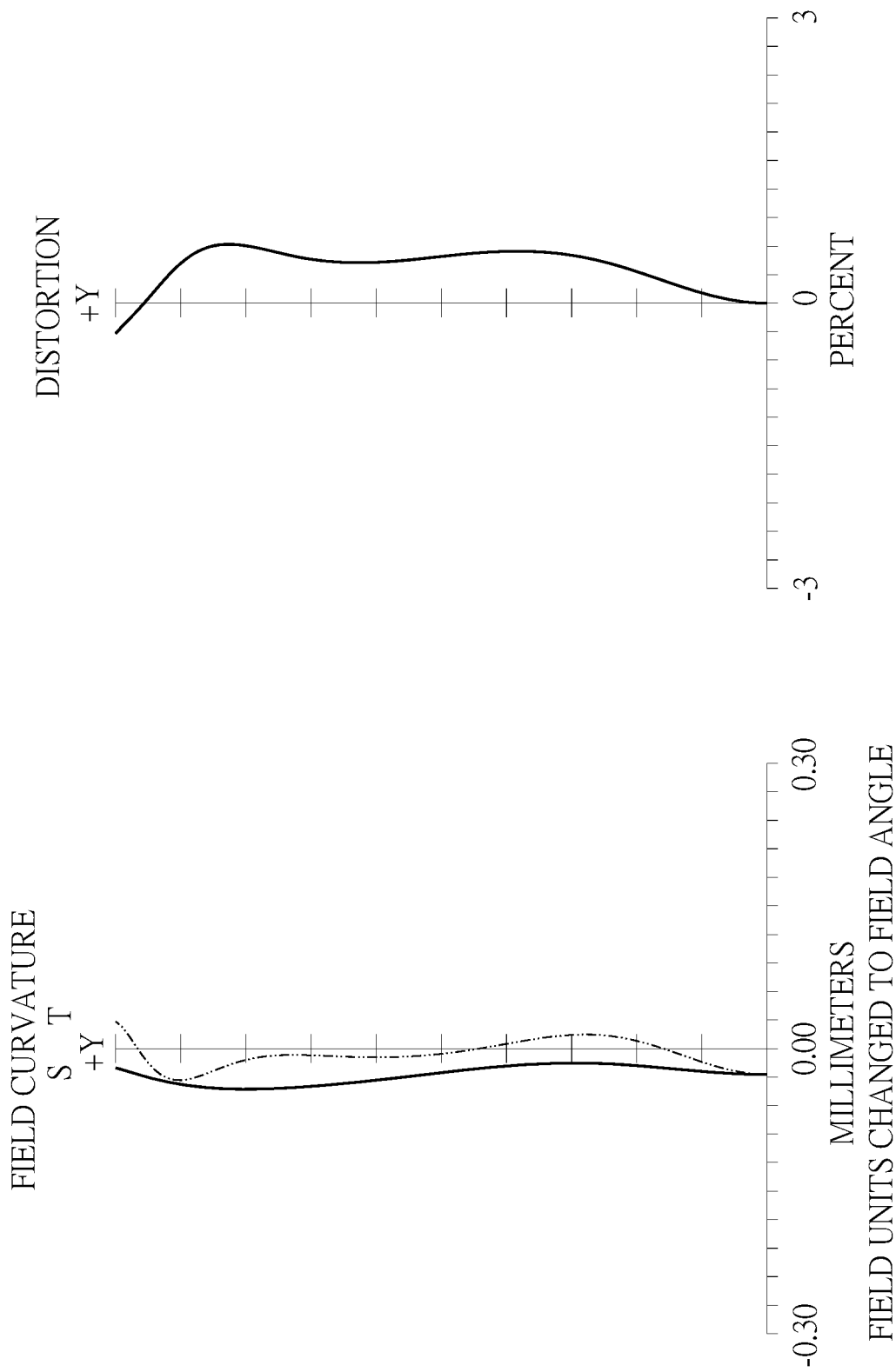
FIG. 6B shows the image plane curve and the distortion curve of the sixth embodiment of the present invention.

Referring to FIGS. 6A and 6B, FIG. 6A shows an optical lens system in accordance with a sixth embodiment of the present invention, and FIG. 6B shows, in order from left to right, the image plane curve and the distortion curve of the sixth embodiment of the present invention. An optical lens system in accordance with the sixth embodiment of the present invention comprises a stop 600 and a lens group. The optical lens system is provided with an image sensor 680. The lens group comprises, in order from an object side to an image side along an optical axis 690: a first lens 610, a second lens 620, a third lens 630, an IR-cut filter 650, a cover glass 660, and an image plane 670, wherein the optical lens system has a total of three lenses with refractive power, but not limited to this. The stop 600 is disposed between the first lens 610 and an object. The image sensor 680 is disposed on the image plane 670.

The first lens 610 with positive refractive power, comprising an object-side surface 611 and an image-side surface 612, the object-side surface 611 of the first lens 610 being convex near the optical axis 690 and the image-side surface 612 of the first lens 610 being convex near the optical axis 690, the object-side surface 611 and the image-side surface 612 of the first lens 610 are aspheric, and the first lens 610 is made of plastic material.

The second lens 620 with positive refractive power, comprising an object-side surface 621 and an image-side surface 622, the object-side surface 621 of the second lens 620 being concave near the optical axis 690 and the image-side surface 622 of the second lens 620 being convex near the optical axis 690, the object-side surface 621 and the image-side surface 622 of the second lens 620 are aspheric, and the second lens 620 is made of plastic material.

The third lens 630 with negative refractive power, comprising an object-side surface 631 and an image-side surface 632, the object-side surface 631 of the third lens 630 being convex near the optical axis 690 and the image-side surface 632 of the third lens 630 being concave near the optical axis 690, the object-side surface 631 and the image-side surface 632 of the third lens 630 are aspheric, and the third lens 630 is made of plastic material.

The IR-cut filter 650 made of glass is located between the third lens 630 and the image plane 670 and has no influence on the focal length of the optical lens system.

The cover glass 660 is located between the IR-cut filter 650 and the image plane 670 and has no influence on the focal length of the optical lens system.

The detailed optical data of the sixth embodiment is shown in table 11, and the aspheric surface data is shown in table 12.

TABLE 11

Embodiment 6
f(focal length) = 2.24 mm, Fno = 2.4, FOV = 78 deg.

| surface | | Curvature Radius | Thickness/gap | Material | Index(nd) | Abbe #(vd) | Focal length |
|---|---|---|---|---|---|---|---|
| 0 | object | infinity | infinity | | | | |
| 1 | stop | infinity | −0.077 | | | | |
| 2 | Lens 1 | 1.295 (ASP) | 0.633 | plastic | 1.544 | 56.0 | 2.27 |
| 3 | | −24.529 (ASP) | 0.287 | | | | |
| 4 | Lens 2 | −0.632 (ASP) | 0.311 | plastic | 1.544 | 56.0 | 5.35 |
| 5 | | −0.610 (ASP) | 0.064 | | | | |
| 6 | Lens 3 | 2.260 (ASP) | 0.505 | plastic | 1.544 | 56.0 | −6.02 |
| 7 | | 1.233 (ASP) | 0.433 | | | | |
| 8 | IR-cut filter | infinity | 0.210 | glass | 1.517 | 64.2 | — |
| 9 | | infinity | 0.234 | | | | |
| 10 | cover glass | infinity | 0.400 | glass | 1.517 | 64.2 | — |
| 11 | | infinity | 0.050 | | | | |
| 12 | Image plane | infinity | — | | | | |

Note:
reference wavelength is 555 nm

TABLE 12

| Aspheric Coefficients | | | | | | |
|---|---|---|---|---|---|---|
| surface | 2 | 3 | 4 | 5 | 6 | 7 |
| K: | −3.2498E+00 | −2.2271E+02 | −1.1165E+00 | −3.3727E+00 | 2.3406E+00 | −1.0499E+01 |
| A: | 3.5590E−02 | −2.0403E−01 | −5.1180E−02 | −8.3431E−01 | −3.7518E−01 | −1.9081E−01 |
| B: | 1.4038E+00 | −4.9831E−01 | 1.0606E+00 | 2.5597E+00 | 4.5676E−01 | 1.6111E−01 |
| C: | −8.4785E+00 | 1.6560E+00 | 9.3833E+00 | 1.4536E+00 | −3.8184E−01 | −7.3750E−02 |
| D: | 1.7384E+00 | 1.5667E+00 | −1.9238E+01 | 2.0927E−01 | −1.1513E−01 | −1.4560E−02 |
| E: | 5.0990E+01 | −8.6287E+00 | −1.2455E+01 | −8.1757E+00 | 4.8161E−01 | 1.1410E−02 |
| F: | 2.4059E+02 | −2.6692E+01 | 1.1957E+01 | −5.1231E+00 | −3.2891E−01 | 6.3629E−03 |
| G: | −9.9598E+02 | 5.4985E+01 | 3.1663E+01 | 1.3868E+01 | 6.7970E−02 | −3.3080E−03 |

In the sixth embodiment, the equation of the aspheric surface profiles of the aforementioned lenses is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f[mm] | 2.24 | FOV/f | 34.80 |
| Fno | 2.37 | TD/TL | 0.58 |
| FOV[deg.] | 78.00 | BFL/TL | 0.42 |
| EPD | 0.94 | TD/BFL | 1.36 |
| f1/f2 | 0.43 | f2/EPD | 5.67 |
| f/TL | 0.72 | R3/EPD | −0.67 |
| T12/CT2 | 0.92 | SD/TL | 0.55 |

Figure 7A:
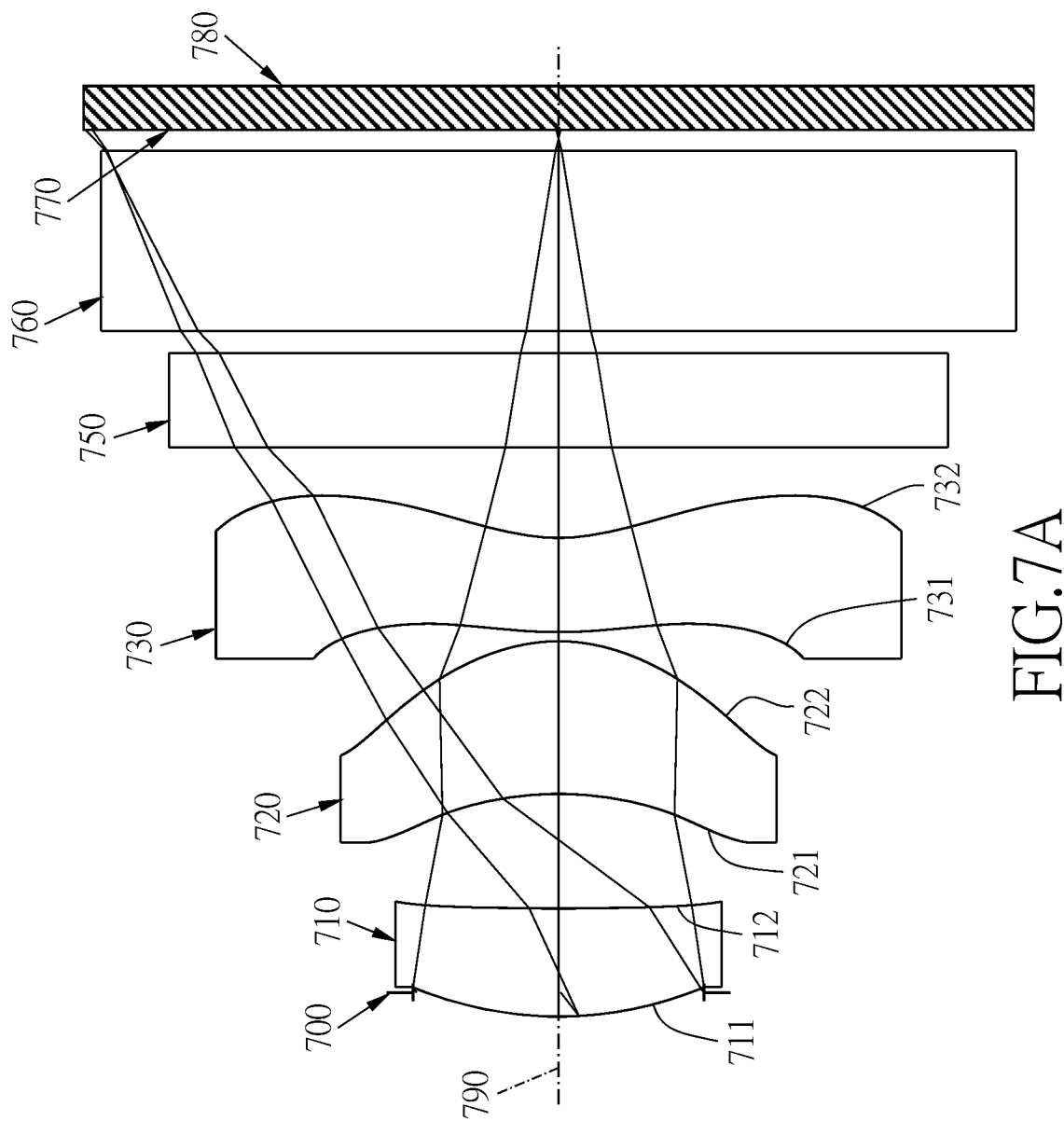
FIG. 7A shows an optical lens system in accordance with a seventh embodiment of the present invention.
Figure 7B:
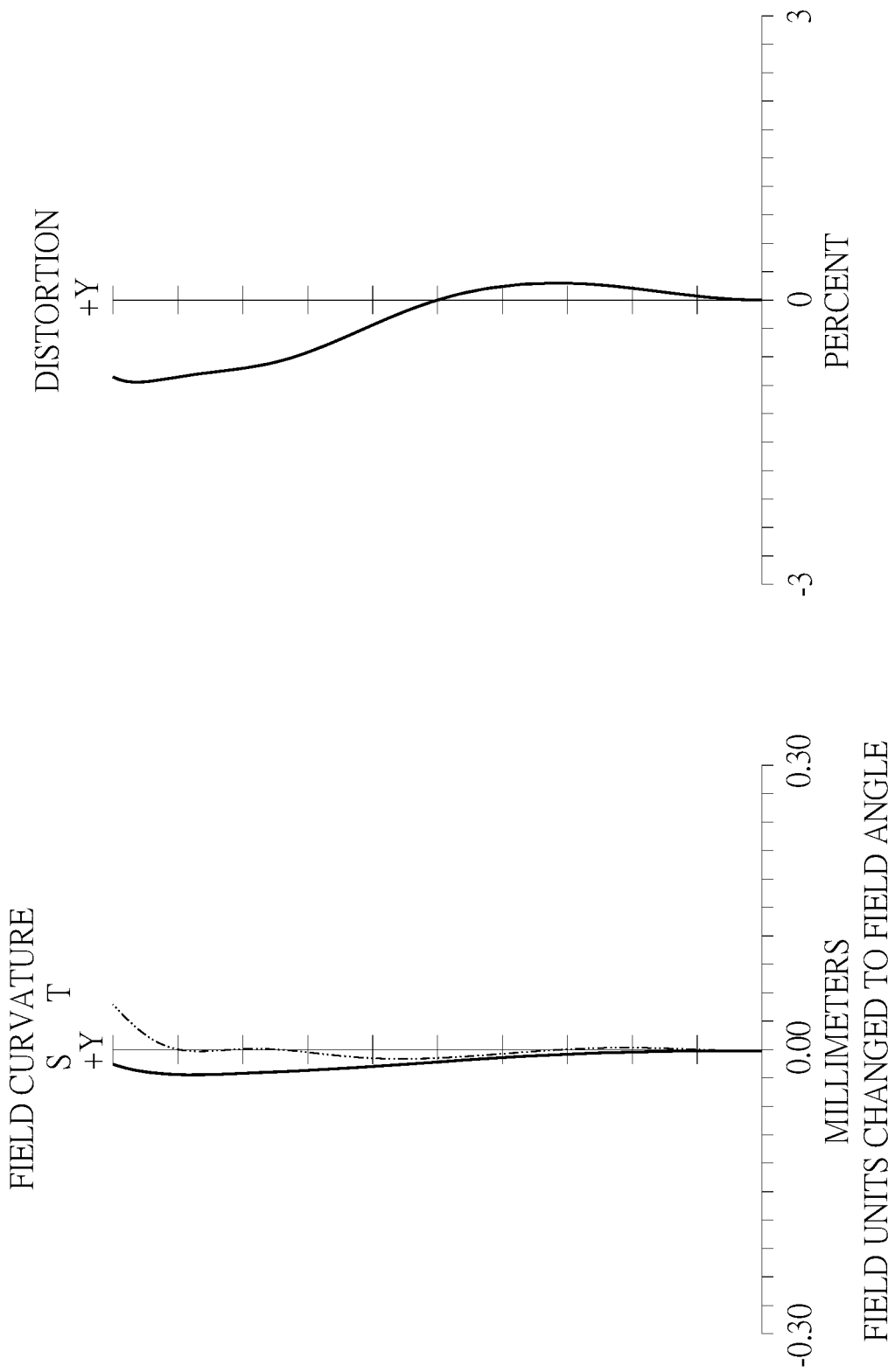
FIG. 7B shows the image plane curve and the distortion curve of the seventh embodiment of the present invention.

Referring to FIGS. 7A and 7B, FIG. 7A shows an optical lens system in accordance with a seventh embodiment of the present invention, and FIG. 7B shows, in order from left to right, the image plane curve and the distortion curve of the seventh embodiment of the present invention. An optical lens system in accordance with the seventh embodiment of the present invention comprises a stop 700 and a lens group. The optical lens system is provided with an image sensor 780. The lens group comprises, in order from an object side to an image side along an optical axis 790: a first lens 710, a second lens 720, a third lens 730, an IR-cut filter 750, a cover glass 760, and an image plane 770, wherein the optical lens system has a total of three lenses with refractive power, but not limited to this. The stop 700 is disposed between the first lens 710 and an object. The image sensor 780 is disposed on the image plane 770.

The first lens 710 with positive refractive power, comprising an object-side surface 711 and an image-side surface 712, the object-side surface 711 of the first lens 710 being convex near the optical axis 790 and the image-side surface 712 of the first lens 710 being concave near the optical axis 790, the object-side surface 711 and the image-side surface 712 of the first lens 710 are aspheric, and the first lens 710 is made of plastic material.

The second lens 720 with positive refractive power, comprising an object-side surface 721 and an image-side surface 722, the object-side surface 721 of the second lens 720 being concave near the optical axis 790 and the image-side surface 722 of the second lens 720 being convex near the optical axis 790, the object-side surface 721 and the image-side surface 722 of the second lens 720 are aspheric, and the second lens 720 is made of plastic material.

The third lens 730 with negative refractive power, comprising an object-side surface 731 and an image-side surface 732, the object-side surface 731 of the third lens 730 being convex near the optical axis 790 and the image-side surface 732 of the third lens 730 being concave near the optical axis 790, the object-side surface 731 and the image-side surface 732 of the third lens 730 are aspheric, and the third lens 730 is made of plastic material.

The IR-cut filter 750 made of glass is located between the third lens 730 and the image plane 770 and has no influence on the focal length of the optical lens system.

The cover glass 760 is located between the IR-cut filter 750 and the image plane 770 and has no influence on the focal length of the optical lens system.

The detailed optical data of the seventh embodiment is shown in table 13, and the aspheric surface data is shown in table 14.

Moreover, these parameters can be calculated from Table 13 and Table 14 as the following values and satisfy the following conditions:

| Embodiment 7 | | | |
|---|---|---|---|
| f[mm] | 1.35 | FOV/f | 55.75 |
| Fno | 2.09 | TD/TL | 0.54 |
| FOV[deg.] | 75.00 | BFL/TL | 0.46 |
| EPD | 0.64 | TD/BFL | 1.18 |
| f1/f2 | 1.44 | f2/EPD | 1.78 |
| f/TL | 0.68 | R3/EPD | −1.14 |
| T12/CT2 | 0.75 | SD/TL | 0.51 |

Figure 8A:
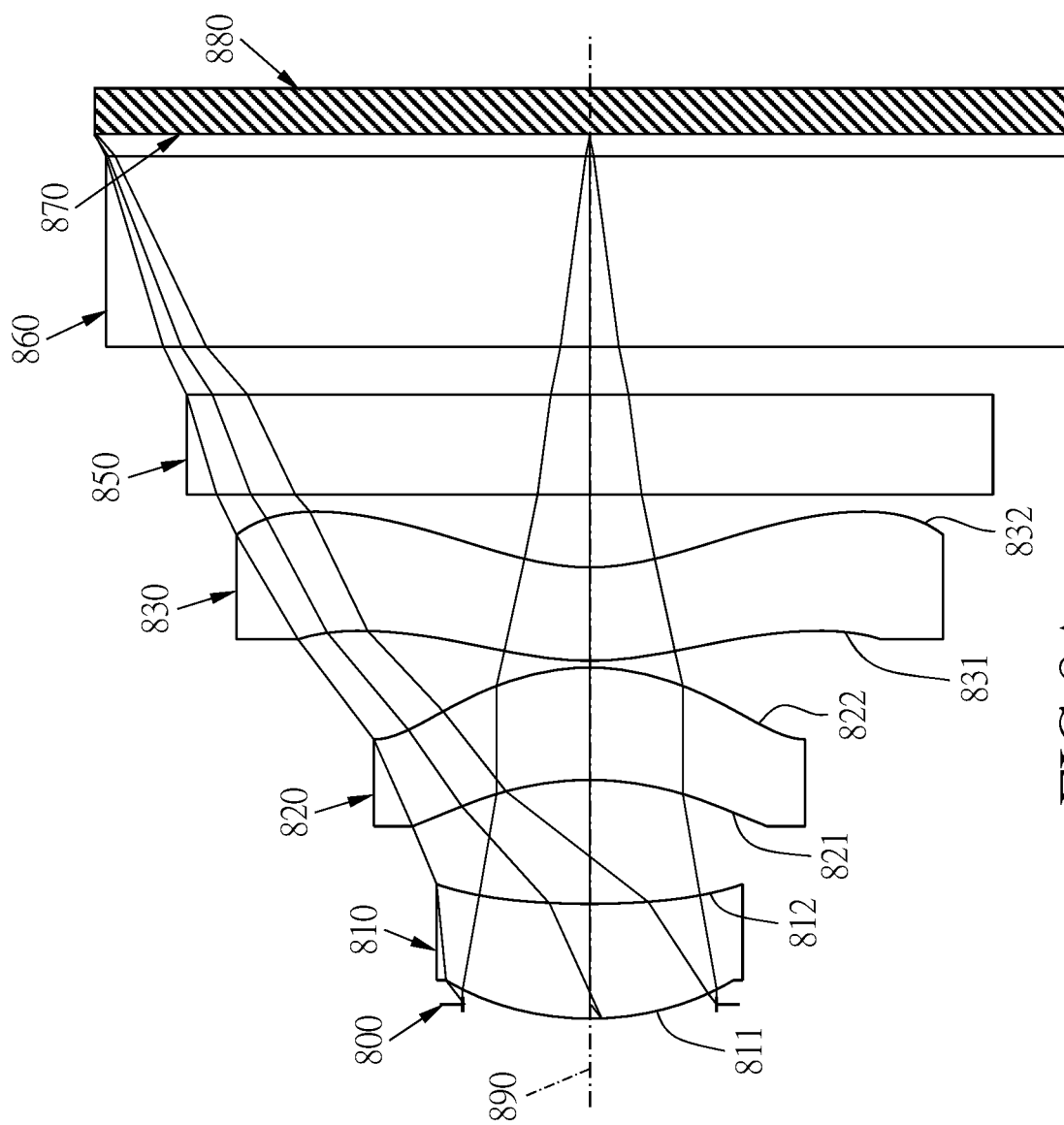
FIG. 8A shows an optical lens system in accordance with an eighth embodiment of the present invention.
Figure 8B:
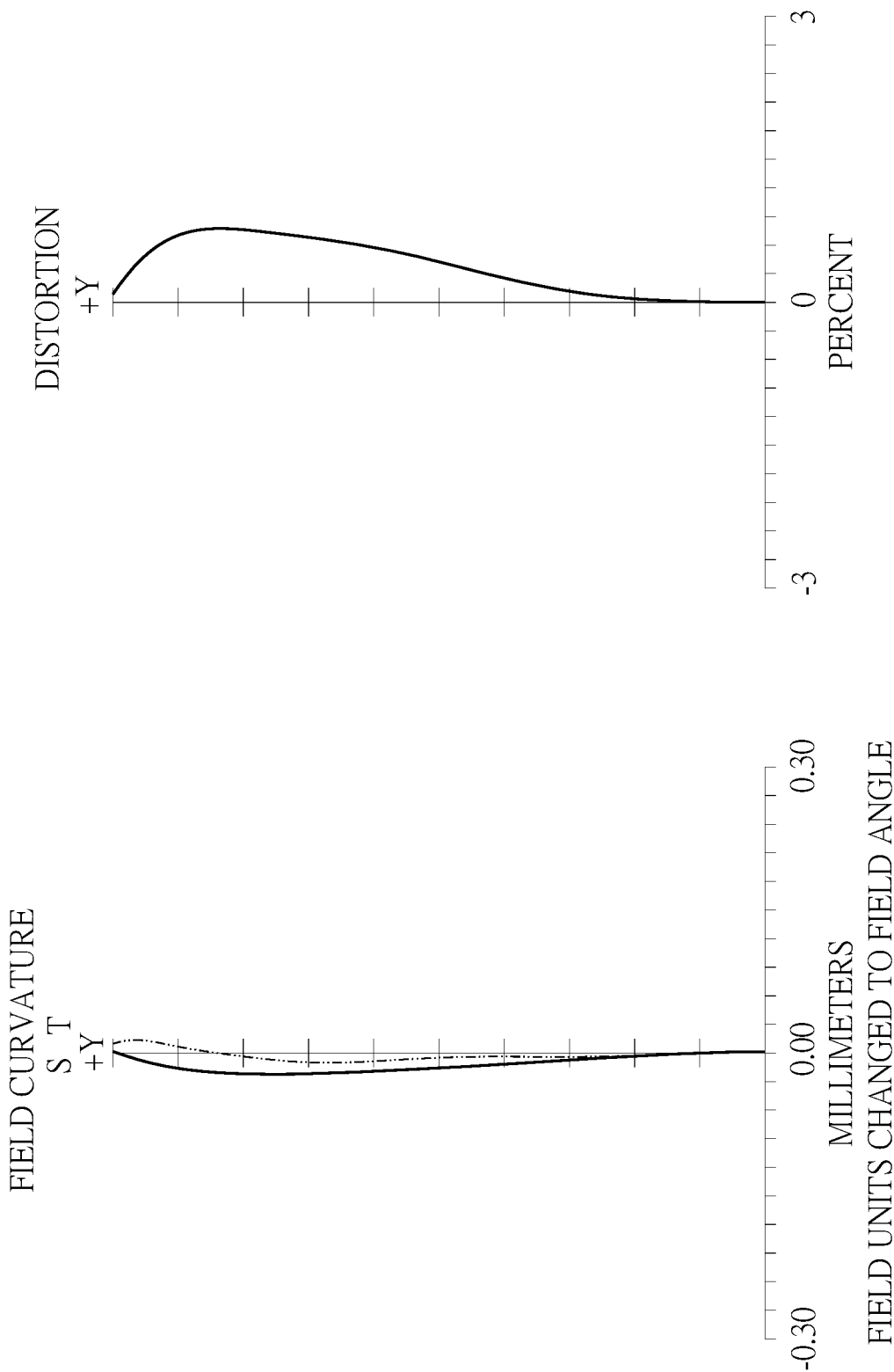
FIG. 8B shows the image plane curve and the distortion curve of the eighth embodiment of the present invention.

Referring to FIGS. 8A and 8B, FIG. 8A shows an optical lens system in accordance with an eighth embodiment of the present invention, and FIG. 8B shows, in order from left to right, the image plane curve and the distortion curve of the eighth embodiment of the present invention. An optical lens system in accordance with the eighth embodiment of the present invention comprises a stop 800 and a lens group. The

TABLE 13

Embodiment 7
f(focal length) = 1.35 mm, Fno = 2.1, FOV = 75 deg.

| surface | | Curvature Radius | Thickness/gap | Material | Index(nd) | Abbe #(vd) | Focal length |
|---|---|---|---|---|---|---|---|
| 0 | object | infinity | infinity | | | | |
| 1 | stop | infinity | −0.054 | | | | |
| 2 | Lens 1 | 0.812 (ASP) | 0.240 | plastic | 1.544 | 56.0 | 1.65 |
| 3 | | 7.354 (ASP) | 0.255 | | | | |
| 4 | Lens 2 | −0.734 (ASP) | 0.340 | plastic | 1.544 | 56.0 | 1.15 |
| 5 | | −0.394 (ASP) | 0.021 | | | | |
| 6 | Lens 3 | 1.025 (ASP) | 0.210 | plastic | 1.642 | 22.5 | −1.34 |
| 7 | | 0.432 (ASP) | 0.201 | | | | |
| 8 | IR-cut filter | infinity | 0.210 | glass | 1.517 | 64.2 | — |
| 9 | | infinity | 0.050 | | | | |
| 10 | cover glass | infinity | 0.400 | glass | 1.517 | 64.2 | — |
| 11 | | infinity | 0.045 | | | | |
| 12 | Image plane | infinity | — | | | | |

Note:
reference wavelength is 555 nm

TABLE 14

Aspheric Coefficients

| surface | 2 | 3 | 4 | 5 | 6 | 7 |
|---|---|---|---|---|---|---|
| K: | 1.3930E−01 | −6.1030E−01 | 2.2647E−01 | −3.2676E+00 | −3.8347E+00 | −5.3534E+00 |
| A: | −7.3926E−01 | 3.7318E−01 | 1.3237E+00 | −2.6809E+00 | −3.4322E+00 | −1.8281E+00 |
| B: | 1.8625E+01 | −1.2873E+01 | −3.6706E+01 | 3.9478E+00 | 7.1935E+00 | 4.4218E+00 |
| C: | −2.2619E+02 | 2.0059E+02 | 3.4957E+02 | −1.8309E+00 | −5.4098E+00 | −5.1237E+00 |
| D: | 7.4916E+02 | −1.5104E+03 | −1.8986E+03 | −7.1354E+00 | 1.1498E+01 | −2.9320E+00 |
| E: | 5.3269E+03 | 7.4356E+03 | 1.0237E+04 | 3.9460E+02 | −7.0522E+01 | 1.1543E+01 |
| F: | −3.2677E+04 | −3.5126E+03 | −2.7348E+04 | −6.1750E+02 | −1.9064E+01 | −9.4739E+00 |
| G: | 1.5279E+04 | −8.2314E+04 | 1.1181E+04 | 2.3095E+02 | −5.6151E+01 | 2.0518E+00 |

In the seventh embodiment, the equation of the aspheric surface profiles of the aforementioned lenses is the same as the equation of the first embodiment. Also, the definitions of these parameters shown in the following table are the same as those stated in the first embodiment with corresponding values for the seventh embodiment, so an explanation in this regard will not be provided again.

optical lens system is provided with an image sensor 880. The lens group comprises, in order from an object side to an image side along an optical axis 890: a first lens 810, a second lens 820, a third lens 830, an IR-cut filter 850, a cover glass 860, and an image plane 870, wherein the optical lens system has a total of three lenses with refractive power, but not limited to this. The stop 800 is disposed between the first lens 810 and an object. The image sensor 880 is disposed on the image plane 870.

The first lens 810 with positive refractive power, comprising an object-side surface 811 and an image-side surface 812, the object-side surface 811 of the first lens 810 being convex near the optical axis 890 and the image-side surface 812 of the first lens 810 being concave near the optical axis 890, the object-side surface 811 and the image-side surface 812 of the first lens 810 are aspheric, and the first lens 810 is made of plastic material.

The second lens 820 with positive refractive power, comprising an object-side surface 821 and an image-side surface 822, the object-side surface 821 of the second lens 820 being concave near the optical axis 890 and the image-side surface 822 of the second lens 820 being convex near the optical axis 890, the object-side surface 821 and the image-side surface 822 of the second lens 820 are aspheric, and the second lens 820 is made of plastic material.

The third lens 830 with negative refractive power, comprising an object-side surface 831 and an image-side surface 832, the object-side surface 831 of the third lens 830 being convex near the optical axis 890 and the image-side surface 832 of the third lens 830 being concave near the optical axis 890, the object-side surface 831 and the image-side surface 832 of the third lens 830 are aspheric, and the third lens 830 is made of plastic material.

The IR-cut filter 850 made of glass is located between the third lens 830 and the image plane 870 and has no influence on the focal length of the optical lens system.

The cover glass 860 is located between the IR-cut filter 850 and the image plane 870 and has no influence on the focal length of the optical lens system.

The detailed optical data of the eighth embodiment is shown in table 15, and the aspheric surface data is shown in table 16.

TABLE 15

Embodiment 8
f(focal length) = 1.33 mm, Fno = 2.5, FOV = 74.8 deg.

| surface | | Curvature Radius | Thickness/gap | Material | Index(nd) | Abbe #(vd) | Focal length |
|---|---|---|---|---|---|---|---|
| 0 | object | infinity | infinity | | | | |
| 1 | stop | infinity | −0.030 | | | | |
| 2 | Lens 1 | 0.610 (ASP) | 0.241 | plastic | 1.544 | 56.0 | 1.62 |
| 3 | | 1.698 (ASP) | 0.260 | | | | |
| 4 | Lens 2 | −0.606 (ASP) | 0.236 | plastic | 1.544 | 56.0 | 2.48 |
| 5 | | −0.476 (ASP) | 0.015 | | | | |
| 6 | Lens 3 | 0.674 (ASP) | 0.195 | plastic | 1.544 | 56.0 | −4.34 |
| 7 | | 0.471 (ASP) | 0.153 | | | | |
| 8 | IR-cut filter | infinity | 0.210 | glass | 1.517 | 64.2 | — |
| 9 | | infinity | 0.100 | | | | |
| 10 | cover glass | infinity | 0.400 | glass | 1.517 | 64.2 | — |
| 11 | | infinity | 0.045 | | | | |
| 12 | Image plane | infinity | — | | | | |

Note:
reference wavelength is 555 nm

TABLE 16

Aspheric Coefficients

| surface | 2 | 3 | 4 | 5 | 6 | 7 |
|---|---|---|---|---|---|---|
| K: | 2.5854E−01 | 9.5265E+00 | −6.6959E−01 | −2.4585E+00 | −1.5165E+00 | −4.1477E+00 |
| A: | −6.0661E−01 | 6.7111E−01 | 1.7265E+00 | −1.0700E+00 | −3.1721E+00 | −1.4136E+00 |
| B: | 2.3293E+01 | −8.2462E+00 | −2.3133E+01 | 4.3664E+00 | 8.0996E+00 | 2.8269E+00 |
| C: | −2.8468E+02 | 1.7041E+02 | 2.1986E+02 | −2.1583E+01 | −1.2331E+01 | −2.7923E+00 |
| D: | 6.8433E+02 | −8.6660E+02 | −2.4568E+03 | 1.3197E+02 | 1.5733E+01 | −3.3462E+00 |
| E: | 1.4886E+04 | 1.8713E+03 | 2.7998E+04 | 1.2244E+03 | −4.2100E+01 | 9.2952E+00 |
| F: | −8.5349E+04 | −3.3578E+03 | −1.0872E+05 | −4.8245E+03 | 4.9671E+01 | −7.1207E+00 |
| G: | 0.0000E+00 | 0.0000E+00 | 0.0000E+00 | 0.0000E+00 | 0.0000E+00 | 0.0000E+00 |

In the eighth embodiment, the equation of the aspheric surface profiles of the aforementioned lenses is the same as the equation of the first embodiment. Also, the definitions of these parameters shown in the following table are the same as those stated in the first embodiment with corresponding values for the eighth embodiment, so an explanation in this regard will not be provided again.

Moreover, these parameters can be calculated from Table 15 and Table 16 as the following values and satisfy the following conditions:

| Embodiment 8 | | | |
|---|---|---|---|
| f[mm] | 1.33 | FOV/f | 56.08 |
| Fno | 2.53 | TD/TL | 0.51 |
| FOV[deg.] | 74.80 | BFL/TL | 0.49 |
| EPD | 0.53 | TD/BFL | 1.04 |
| f1/f2 | 0.65 | f2/EPD | 4.70 |
| f/TL | 0.72 | R3/EPD | −1.15 |
| T12/CT2 | 1.10 | SD/TL | 0.49 |

Figure 9A:
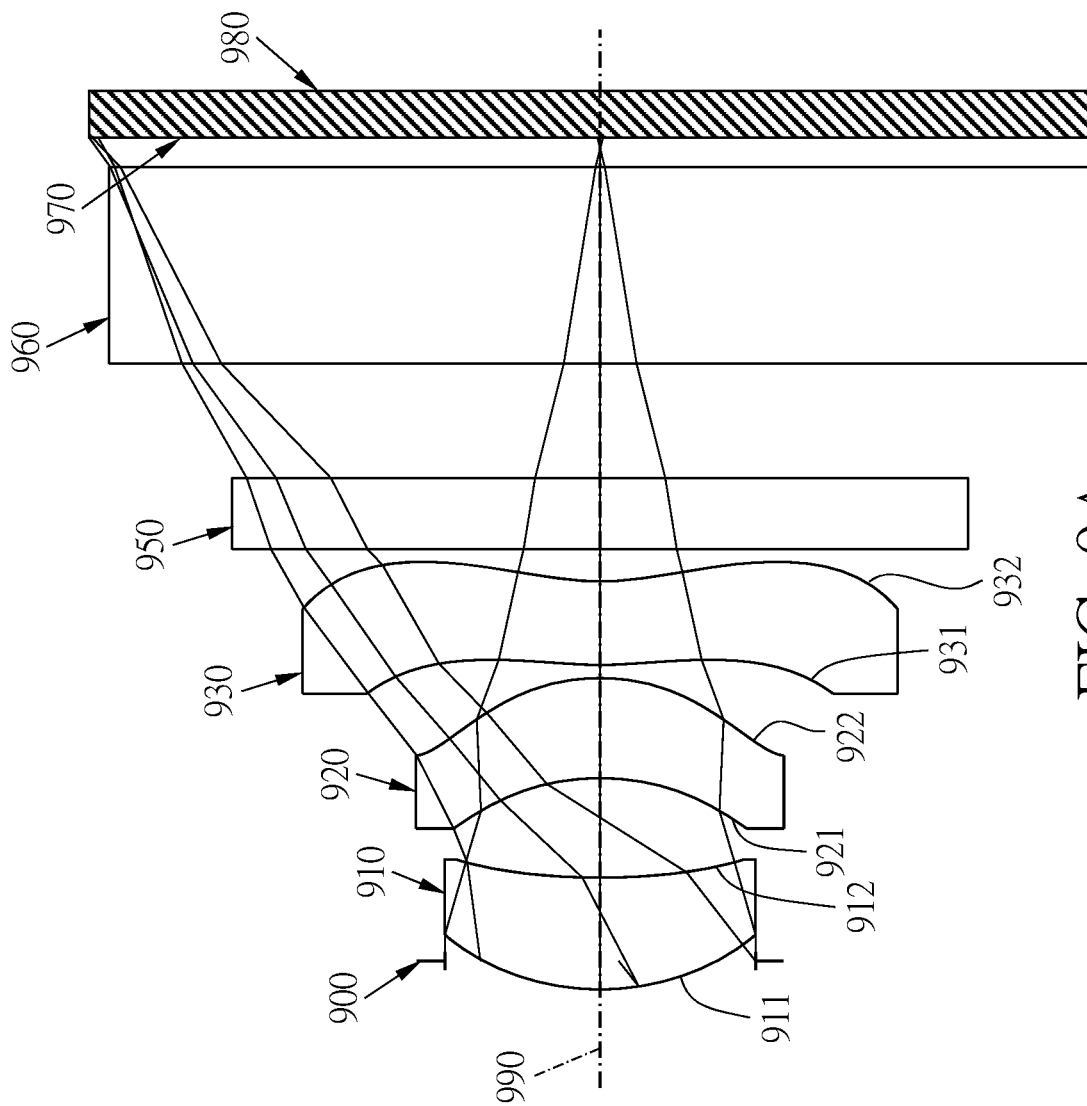
FIG. 9A shows an optical lens system in accordance with a ninth embodiment of the present invention.
Figure 9B:
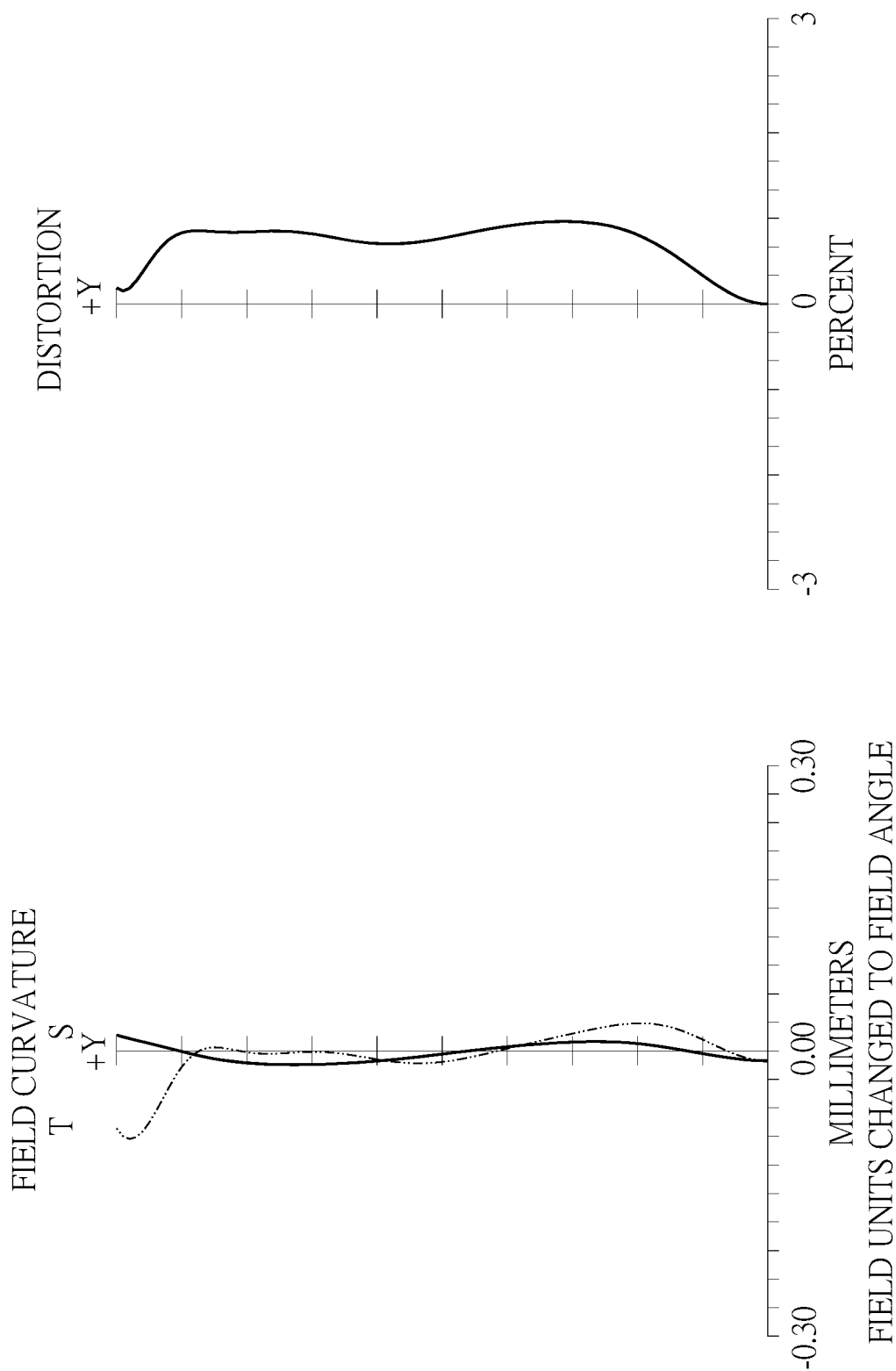
FIG. 9B shows the image plane curve and the distortion curve of the ninth embodiment of the present invention.

Referring to FIGS. 9A and 9B, FIG. 9A shows an optical lens system in accordance with a ninth embodiment of the present invention, and FIG. 9B shows, in order from left to right, the image plane curve and the distortion curve of the ninth embodiment of the present invention. An optical lens system in accordance with the ninth embodiment of the present invention comprises a stop 900 and a lens group. The optical lens system is provided with an image sensor 980. The lens group comprises, in order from an object side to an image side along an optical axis 990: a first lens 910, a second lens 920, a third lens 930, an IR-cut filter 950, a cover glass 960, and an image plane 970, wherein the optical lens system has a total of three lenses with refractive power, but not limited to this. The stop 900 is disposed between the first lens 910 and an object. The image sensor 980 is disposed on the image plane 970.

The first lens 910 with positive refractive power, comprising an object-side surface 911 and an image-side surface 912, the object-side surface 911 of the first lend 910 being convex near the optical axis 990 and the image-side surface 912 of the first lens 910 being concave near the optical axis 990, the object-side surface 911 and the image-side surface 912 of the first lens 910 are aspheric, and the first lens 910 is made of plastic material.

The second lens 920 with positive refractive power, comprising an object-side surface 921 and an image-side surface 922, the object-side surface 921 of the second lens 920 being concave near the optical axis 990 and the image-side surface 922 of the second lens 920 being convex near the optical axis 990, the object-side surface 921 and the image-side surface 922 of the second lens 920 are aspheric, and the second lens 920 is made of plastic material.

The third lens 930 with negative refractive power, comprising an object-side surface 931 and an image-side surface 932, the object-side surface 931 of the third lens 930 being convex near the optical axis 990 and the image-side surface 932 of the third lens 930 being concave near the optical axis 990, the object-side surface 931 and the image-side surface 932 of the third lens 930 are aspheric, and the third lens 930 is made of plastic material.

The IR-cut filter 950 made of glass is located between the third lens 930 and the image plane 970 and has no influence on the focal length of the optical lens system.

The cover glass 960 is located between the IR-cut filter 950 and the image plane 970 and has no influence on the focal length of the optical lens system.

The detailed optical data of the ninth embodiment is shown in table 17, and the aspheric surface data is shown in table 18.

TABLE 17

Embodiment 9
f(focal length) = 1.3 mm, Fno = 2.1, FOV = 76.2 deg.

| surface | | Curvature Radius | Thickness/gap | Material | Index(nd) | Abbe #(vd) | Focal length |
|---|---|---|---|---|---|---|---|
| 0 | object | infinity | infinity | | | | |
| 1 | stop | infinity | −0.058 | | | | |
| 2 | Lens 1 | 0.520 (ASP) | 0.227 | plastic | 1.544 | 56.0 | 1.40 |
| 3 | | 1.380 (ASP) | 0.202 | | | | |
| 4 | Lens 2 | −0.494 (ASP) | 0.203 | plastic | 1.544 | 56.0 | 4.23 |
| 5 | | −0.466 (ASP) | 0.027 | | | | |
| 6 | Lens 3 | 0.701 (ASP) | 0.170 | plastic | 1.643 | 22.5 | −7.42 |
| 7 | | 0.553 (ASP) | 0.065 | | | | |
| 8 | IR-cut filter | infinity | 0.145 | glass | 1.517 | 64.2 | — |
| 9 | | infinity | 0.232 | | | | |
| 10 | cover glass | infinity | 0.400 | glass | 1.517 | 64.2 | — |
| 11 | | infinity | 0.059 | | | | |
| 12 | Image plane | infinity | — | | | | |

Note:
reference wavelength is 555 nm

TABLE 18

Aspheric Coefficients

| surface | 2 | 3 | 4 | 5 | 6 | 7 |
|---|---|---|---|---|---|---|
| K: | −1.9206E−01 | 1.1700E+01 | 1.6033E−01 | −4.3420E−01 | −4.4286E+01 | −4.3572E+00 |
| A: | 1.4160E+00 | −2.4424E−02 | −3.6970E+00 | −1.6482E+01 | −8.0384E+00 | −7.2572E+00 |
| B: | −6.3755E+01 | 8.1015E+00 | 2.5832E+02 | 5.0237E+02 | 1.2245E+02 | 6.5552E+01 |
| C: | 2.4044E+03 | −2.7674E+02 | −1.2060E+04 | −9.4165E+03 | −1.3668E+03 | −4.2117E+02 |
| D: | −4.7476E+04 | 3.2535E+03 | 2.9945E+05 | 1.1481E+05 | 9.7879E+03 | 1.7034E+03 |
| E: | 5.1994E+05 | −9.4937E+03 | −4.0901E+06 | −8.5777E+05 | −4.3362E+04 | −4.1650E+03 |
| F: | −2.9397E+06 | 3.4660E+04 | 2.9705E+07 | 3.6123E+06 | 1.0454E+05 | 5.4785E+03 |
| G: | 6.7618E+06 | −7.2760E+05 | −8.9416E+07 | −6.4537E+06 | −1.0257E+05 | −2.9413E+03 |

In the ninth embodiment, the equation of the aspheric surface profiles of the aforementioned lenses is the same as the equation of the first embodiment. Also, the definitions of these parameters shown in the following table are the same as those stated in the first embodiment with corresponding values for the ninth embodiment, so an explanation in this regard will not be provided again.

Moreover, these parameters can be calculated from Table 17 and Table 18 as the following values and satisfy the following conditions:

| Embodiment 9 | | | |
|---|---|---|---|
| f[mm] | 1.30 | FOV/f | 58.77 |
| Fno | 2.07 | TD/TL | 0.45 |
| FOV[deg.] | 76.20 | BFL/TL | 0.52 |
| EPD | 0.63 | TD/BFL | 0.86 |
| f1/f2 | 0.33 | f2/EPD | 6.76 |
| f/TL | 0.75 | R3/EPD | −0.79 |
| T12/CT2 | 1.00 | SD/TL | 0.45 |

Figure 10:
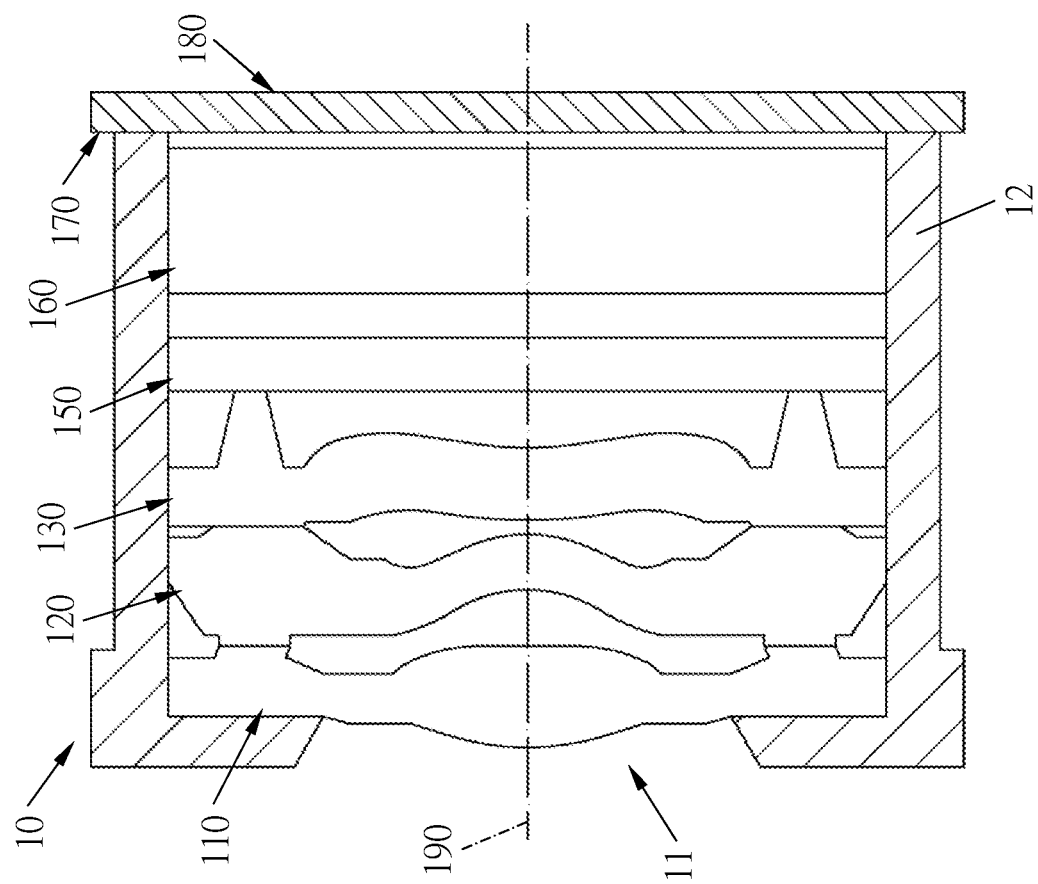
FIG. 10 shows a photographing module in accordance with a tenth embodiment of the present invention.

Referring to FIG. 10, which shows a photographing module in accordance with a tenth embodiment of the present invention, the photographing module 10 is arranged in a notebook, but not limited to this. The photographing module 10 includes an optical lens system 11, a lens barrel 12 and an image sensor 180. The optical lens system 11 is the optical lens system of the above first embodiment, but not limited to this, and can also be the optical lens systems of the above second to ninth embodiments. In addition, the lenses of the optical lens system in FIG. 10 show the unlit peripheral parts, which is slightly different from that of the first embodiment. The lens barrel 12 is provided for accommodating the optical lens system 11. The image sensor 180 is disposed on an image plane 170 of the optical lens system and is an electronic sensor (such as, CMOS, CCD) with good brightness and low noise to really present the imaging quality of the optical lens system.

In the present optical lens system, the lenses can be made of plastic or glass. If the lenses are made of plastic, the cost will be effectively reduced. If the lenses are made of glass, there is more freedom in distributing the refractive power of the optical lens system. Plastic lenses can have aspheric surfaces, which allow more design parameter freedom (than spherical surfaces), so as to reduce the aberration and the number of the lenses, as well as the total length of the optical lens system.

In the present optical lens system, if the object-side or the image-side surface of the lenses with refractive power is convex and the location of the convex surface is not defined, the object-side or the image-side surface of the lenses near the optical axis is convex. If the object-side or the image-side surface of the lenses is concave and the location of the concave surface is not defined, the object-side or the image-side surface of the lenses near the optical axis is concave.

The optical lens system of the present invention can be used in focusing optical systems and can obtain better image quality. The optical lens system of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. An optical lens system, in order from an object side to an image side, comprising:
  a stop;
  a first lens with positive refractive power, comprising an object-side surface and an image-side surface, the object-side surface of the first lens being convex near an optical axis, and the object-side surface and the image-side surface of the first lens being aspheric;
  a second lens with positive refractive power, comprising an object-side surface and an image-side surface, the object-side surface of the second lens being concave near the optical axis and the image-side surface of the second lens being convex near the optical axis, and the object-side surface and the image-side surface of the second lens being aspheric;
  a third lens with negative refractive power, comprising an object-side surface and an image-side surface, the image-side surface of the third lens being concave near the optical axis, and the object-side surface and the image-side surface of the third lens being aspheric;
  wherein a distance from the image-side surface of the third lens to an image plane along the optical axis is BFL, a distance from the object-side surface of the first lens to the image plane along the optical axis is TL, the optical lens system has a maximum view angle (field of view) FOV, a focal length of the optical lens system is f, and following condition are satisfied: 0.38<BFL/TL<0.58 and 55.75≤FOV/f≤58.77; or 0.38<BFL/TL<0.58 and 63.31≤FOV/f≤65.41.

2. The optical lens system as claimed in claim 1, wherein a distance from the stop to the image-side surface of the third lens along the optical axis is SD, the distance from the object-side surface of the first lens to the image plane along the optical axis is TL, and following condition is satisfied: 0.35<SD/TL<0.57.

3. The optical lens system as claimed in claim 1, wherein the focal length of the optical lens system is f, the distance from the object-side surface of the first lens to the image plane along the optical axis is TL, and following condition is satisfied: 0.65<f/TL<0.86.

4. The optical lens system as claimed in claim 1, wherein a radius of curvature of the object-side surface of the second lens is R3, an incident pupil aperture of the optical lens system is EPD, and following condition is satisfied: −1.5<R3/EPD<−0.3.

5. The optical lens system as claimed in claim 1, wherein a focal length of the second lens is f2, an incident pupil aperture of the optical lens system is EPD, and following condition is satisfied: 1.5<f2/EPD<198.77.

6. The optical lens system as claimed in claim 1, wherein a distance from the object-side surface of the first lens to the image-side surface of the third lens along the optical axis is TD, the distance from the object-side surface of the first lens to the image plane along the optical axis is TL, and following condition is satisfied: 0.36<TD/TL<0.62.

7. The optical lens system as claimed in claim 1, wherein the distance from the image-side surface of the third lens to the image plane along the optical axis is BFL, the distance from the object-side surface of the first lens to the image plane along the optical axis is TL, and following condition is satisfied: 0.43<BFL/TL<0.54.

8. An optical lens system, in order from an object side to an image side, comprising:
a stop;
a first lens with positive refractive power, comprising an object-side surface and an image-side surface, the object-side surface of the first lens being convex near an optical axis, and the object-side surface and the image-side surface of the first lens being aspheric;
a second lens with positive refractive power, comprising an object-side surface and an image-side surface, the object-side surface of the second lens being concave near the optical axis and the image-side surface of the second lens being convex near the optical axis, and the object-side surface and the image-side surface of the second lens being aspheric;
a third lens with negative refractive power, comprising an object-side surface and an image-side surface, the image-side surface of the third lens being concave near the optical axis, and the object-side surface and the image-side surface of the third lens being aspheric;
wherein an incident pupil aperture of the optical lens system is EPD, a distance from the stop to the image-side surface of the third lens along the optical axis is SD, a distance from the object-side surface of the first lens to an image plane along the optical axis is TL, the optical lens system has a maximum view angle (field of view) FOV, a focal length of the optical lens system is f, and following conditions are satisfied: 0.3<EPD<1.2, 0.35<SD/TL<0.57, and 55.75≤FOV/f≤58.77; or 0.3<EPD<1.2, 0.35<SD/TL<0.57, and 63.31≤FOV/f≤65.41.

9. The optical lens system as claimed in claim 8, wherein a focal length of the first lens is f1, a focal length of the second lens is f2, and following condition is satisfied: 0.008<f1/f2<1.58.

10. The optical lens system as claimed in claim 8, wherein a distance from the image-side surface of the first lens to the object-side surface of the second lens along the optical axis is T12, a central thickness of the second lens along the optical axis is CT2, and following condition is satisfied: 0.6<T12/CT2<1.33.

11. A photographing module, comprising:
a lens barrel,
an optical lens system disposed in the lens barrel, and
an image sensor disposed on an image plane of the optical lens system,
wherein the optical lens system, in order from an object side to an image side, comprising:
a stop;
a first lens with positive refractive power, comprising an object-side surface and an image-side surface, the object-side surface of the first lens being convex near an optical axis, and the object-side surface and the image-side surface of the first lens being aspheric;
a second lens with positive refractive power, comprising an object-side surface and an image-side surface, the object-side surface of the second lens being concave near the optical axis and the image-side surface of the second lens being convex near the optical axis, and the object-side surface and the image-side surface of the second lens being aspheric;
a third lens with negative refractive power, comprising an object-side surface and an image-side surface, the image-side surface of the third lens being concave near the optical axis, and the object-side surface and the image-side surface of the third lens being aspheric;
wherein a distance from the image-side surface of the third lens to the image plane along the optical axis is BFL, a distance from the object-side surface of the first lens to the image plane along the optical axis is TL, the optical lens system has a maximum view angle (field of view) FOV, a focal length of the optical lens system is f, and following condition are satisfied: 0.38<BFL/TL<0.58 and 55.75≤FOV/f≤58.77; or 0.38<BFL/TL<0.58 and 63.31≤FOV/f≤65.41.

12. The photographing module as claimed in claim 11, wherein a distance from the stop to the image-side surface of the third lens along the optical axis is SD, the distance from the object-side surface of the first lens to the image plane along the optical axis is TL, and following condition is satisfied: 0.35<SD/TL<0.57.

13. The photographing module as claimed in claim 11, wherein the focal length of the optical lens system is f, the distance from the object-side surface of the first lens to the image plane along the optical axis is TL, and following condition is satisfied: 0.65<f/TL<0.86.

14. The photographing module as claimed in claim 11, wherein a radius of curvature of the object-side surface of the second lens is R3, an incident pupil aperture of the optical lens system is EPD, and following condition is satisfied: −1.5<R3/EPD<−0.3.

15. The photographing module as claimed in claim 11, wherein a focal length of the second lens is f2, an incident pupil aperture of the optical lens system is EPD, and following condition is satisfied: 1.5<f2/EPD<198.77.

16. The photographing module as claimed in claim 11, wherein a distance from the object-side surface of the first lens to the image-side surface of the third lens along the optical axis is TD, the distance from the object-side surface of the first lens to the image plane along the optical axis is TL, and following condition is satisfied: 0.36<TD/TL<0.62.

17. The photographing module as claimed in claim 11, wherein the distance from the image-side surface of the third lens to the image plane along the optical axis is BFL, the distance from the object-side surface of the first lens to the image plane along the optical axis is TL, and following condition is satisfied: 0.43<BFL/TL<0.54.

18. A photographing module, comprising:

a lens barrel, an optical lens system disposed in the lens barrel, and an image sensor disposed on an image plane of the optical lens system, wherein the optical lens system, in order from an object side to an image side, comprising:

a stop;

a first lens with positive refractive power, comprising an object-side surface and an image-side surface, the object-side surface of the first lens being convex near an optical axis, and the object-side surface and the image-side surface of the first lens being aspheric;

a second lens with positive refractive power, comprising an object-side surface and an image-side surface, the object-side surface of the second lens being concave near the optical axis and the image-side surface of the second lens being convex near the optical axis, and the object-side surface and the image-side surface of the second lens being aspheric;

a third lens with negative refractive power, comprising an object-side surface and an image-side surface, the image-side surface of the third lens being concave near the optical axis, and the object-side surface and the image-side surface of the third lens being aspheric;

wherein an incident pupil aperture of the optical lens system is EPD, a distance from the stop to the image-side surface of the third lens along the optical axis is SD, a distance from the object-side surface of the first lens to the image plane along the optical axis is TL, the optical lens system has a maximum view angle (field of view) FOV, a focal length of the optical lens system is f, and following conditions are satisfied: $0.3<EPD<1.2$, $0.35<SD/TL<0.57$, and $55.75 \leq FOV/f \leq 58.77$; or $0.3<EPD<1.2$, $0.35<SD/TL<0.57$, and $63.31 \leq FOV/f \leq 65.41$.

19. The photographing module as claimed in claim 18, wherein a focal length of the first lens is f1, a focal length of the second lens is f2, and following condition is satisfied: $0.008<f1/f2<1.58$.

20. The photographing module as claimed in claim 18, wherein a distance from the image-side surface of the first lens to the object-side surface of the second lens along the optical axis is T12, a central thickness of the second lens along the optical axis is CT2, and following condition is satisfied: $0.6<T12/CT2<1.33$.

* * * * *